(12) United States Patent
Wu et al.

(10) Patent No.: US 12,535,911 B2
(45) Date of Patent: Jan. 27, 2026

(54) ELECTRONIC DEVICE

(71) Applicant: InnoLux Corporation, Miao-Li County (TW)

(72) Inventors: Yuan-Lin Wu, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/923,656

(22) Filed: Oct. 22, 2024

(65) Prior Publication Data

US 2025/0044896 A1 Feb. 6, 2025

Related U.S. Application Data

(63) Continuation of application No. 18/234,391, filed on Aug. 16, 2023, now Pat. No. 12,153,757, which is a continuation of application No. 17/895,018, filed on Aug. 24, 2022, now Pat. No. 11,762,502, which is a continuation of application No. 17/107,970, filed on Dec. 1, 2020, now Pat. No. 11,449,174.

(30) Foreign Application Priority Data

Dec. 17, 2019 (CN) .......................... 201911299638.9

(51) Int. Cl.
  *G06F 3/041* (2006.01)
  *G06F 3/044* (2006.01)
  *G06V 40/13* (2022.01)

(52) U.S. Cl.
  CPC .......... *G06F 3/04166* (2019.05); *G06V 40/13* (2022.01); *G06F 3/04164* (2019.05); *G06F 3/0446* (2019.05); *G06F 2203/04102* (2013.01); *G06F 2203/04111* (2013.01)

(58) Field of Classification Search
  CPC ............ G06F 3/04166; G06F 3/04164; G06F 3/0446; G06F 2203/04102; G06F 2203/04111; G06F 1/1641; G06F 1/1677; G06F 3/0416; G06V 40/13
  See application file for complete search history.

(56) References Cited

U.S. PATENT DOCUMENTS

| | | | | |
|---|---|---|---|---|
| 6,144,358 A | * | 11/2000 | Narayanaswamy | G06F 1/1647 345/173 |
| 6,252,563 B1 | * | 6/2001 | Tada | G06F 3/038 345/173 |
| 6,466,369 B1 | * | 10/2002 | Maddock | H04N 9/3141 359/461 |
| 6,573,913 B1 | * | 6/2003 | Butler | G06F 3/038 345/1.3 |
| 8,479,122 B2 | * | 7/2013 | Hotelling | G06F 3/04883 715/767 |
| 8,704,781 B2 | * | 4/2014 | Kii | G06F 3/0416 345/173 |

(Continued)

*Primary Examiner* — Benyam Ketema
(74) *Attorney, Agent, or Firm* — Winston Hsu

(57) ABSTRACT

An electronic device includes a substrate, a sensing unit overlapped with the substrate and including a first sub-unit and a second sub-unit, a first signal input electrically connected to the first sub-unit and a second signal input electrically connected to the second sub-unit. The first sub-unit and the second sub-unit are symmetrical to an axis, and the first signal input and the second signal input are asymmetrical to the axis.

10 Claims, 17 Drawing Sheets

(56) References Cited

U.S. PATENT DOCUMENTS

| | | | | |
|---|---|---|---|---|
| 8,810,543 | B1* | 8/2014 | Kurikawa | G06F 3/04166 345/173 |
| 9,098,159 | B2* | 8/2015 | Grunthaner | G06F 3/0446 |
| D777,131 | S* | 1/2017 | Lee | D14/345 |
| 10,452,104 | B2* | 10/2019 | Matsumoto | G06F 1/1641 |
| 10,613,586 | B2* | 4/2020 | Yamazaki | H10K 77/111 |
| 10,866,694 | B2* | 12/2020 | Kim | G06F 3/1446 |
| 11,287,850 | B2* | 3/2022 | Chen | G09F 9/301 |
| 11,681,330 | B2* | 6/2023 | Sim | G06F 3/0412 345/173 |
| 2002/0158811 | A1* | 10/2002 | Davis | G06F 1/1632 345/1.1 |
| 2003/0162162 | A1* | 8/2003 | Marggraff | G09B 7/00 434/410 |
| 2005/0270278 | A1* | 12/2005 | Ouchi | G06F 3/03545 345/173 |
| 2009/0251429 | A1* | 10/2009 | Hung | G06F 3/04164 345/173 |
| 2009/0322689 | A1* | 12/2009 | Kwong | G06F 3/04883 345/173 |
| 2010/0064536 | A1* | 3/2010 | Caskey | G06F 1/1694 33/303 |
| 2010/0066643 | A1* | 3/2010 | King | G06F 3/1446 345/1.3 |
| 2010/0201604 | A1* | 8/2010 | Kee | G06F 1/1641 345/1.3 |
| 2011/0050673 | A1* | 3/2011 | Lee | G09G 3/344 345/211 |
| 2011/0216064 | A1* | 9/2011 | Dahl | H04M 1/0247 345/428 |
| 2012/0084722 | A1* | 4/2012 | Cassar | G06F 3/04883 715/800 |
| 2012/0262367 | A1* | 10/2012 | Chiu | G06F 1/1626 345/156 |
| 2013/0010405 | A1* | 1/2013 | Rothkopf | H04M 1/0268 361/679.01 |
| 2013/0321340 | A1* | 12/2013 | Seo | G06F 3/0486 345/174 |
| 2014/0028597 | A1* | 1/2014 | Cho | G06F 3/04842 345/173 |
| 2014/0054151 | A1* | 2/2014 | Wu | B82Y 30/00 977/956 |
| 2014/0055392 | A1* | 2/2014 | Wu | H01H 1/0094 977/956 |
| 2014/0055686 | A1* | 2/2014 | Wu | G06F 3/041 349/12 |
| 2014/0065326 | A1* | 3/2014 | Lee | G09F 9/301 428/12 |
| 2014/0152576 | A1* | 6/2014 | Kim | G06F 3/0412 345/169 |
| 2014/0226275 | A1* | 8/2014 | Ko | G06F 1/1601 361/679.27 |
| 2014/0380203 | A1* | 12/2014 | Freedman | G06F 3/0412 715/761 |
| 2015/0022090 | A1* | 1/2015 | Kim | G06F 1/3218 315/130 |
| 2015/0022436 | A1 | 1/2015 | Cho | |
| 2015/0022515 | A1* | 1/2015 | Ikeda | G09G 3/035 345/212 |
| 2015/0116256 | A1* | 4/2015 | Hsu | G06F 3/04166 345/174 |
| 2015/0242022 | A1* | 8/2015 | Hung | G06F 3/0446 345/174 |
| 2015/0316976 | A1* | 11/2015 | Toyotaka | G06F 1/1677 361/679.27 |
| 2015/0382446 | A1* | 12/2015 | Kwon | G06F 1/1643 174/251 |
| 2016/0034047 | A1* | 2/2016 | Lee | G06F 3/0484 345/156 |
| 2016/0054757 | A1* | 2/2016 | Reeves | G06F 1/1649 715/761 |
| 2016/0170513 | A1* | 6/2016 | Lee | G06F 3/0418 345/173 |
| 2016/0212890 | A1* | 7/2016 | Jeong | G06F 1/1652 |
| 2017/0131809 | A1* | 5/2017 | Lin | G06F 1/1652 |
| 2018/0081219 | A1* | 3/2018 | Kim | G02F 1/133305 |
| 2018/0246609 | A1* | 8/2018 | Endo | G06F 3/0446 |
| 2018/0270959 | A1* | 9/2018 | Okamoto | G02F 1/13452 |
| 2018/0322848 | A1* | 11/2018 | Wu | G09G 5/00 |
| 2019/0237532 | A1* | 8/2019 | Ahn | H05K 1/189 |
| 2019/0251876 | A1* | 8/2019 | Kim | G06F 1/1652 |
| 2020/0068725 | A1* | 2/2020 | Park | H10K 59/87 |
| 2020/0150481 | A1* | 5/2020 | You | H10K 77/111 |
| 2020/0234616 | A1* | 7/2020 | Ha | G09F 9/301 |
| 2021/0096887 | A1* | 4/2021 | Klein | G09G 5/14 |
| 2022/0179455 | A1* | 6/2022 | Zhu | G06F 1/1641 |
| 2022/0382328 | A1* | 12/2022 | Sim | G06F 1/1637 |
| 2022/0391039 | A1* | 12/2022 | Kim | G06F 1/1616 |
| 2023/0176685 | A1* | 6/2023 | Zhang | G06F 3/04166 345/173 |
| 2023/0393687 | A1* | 12/2023 | Wu | G06V 40/13 |

* cited by examiner

ELECTRONIC DEVICE

CROSS REFERENCE TO RELATED APPLICATIONS

This application is a continuation application of U.S. application Ser. No. 18/234,391, filed on Aug. 16, 2023, which is a continuation application of U.S. application Ser. No. 17/895,018, filed on Aug. 24, 2022, which is a continuation application of U.S. application Ser. No. 17/107,970, filed on Dec. 1, 2020. The contents of these applications are incorporated herein by reference.

BACKGROUND OF THE DISCLOSURE

1. Field of the Disclosure

The present disclosure relates to an electronic device, more particularly to an electronic device with a sensing unit.

2. Description of the Prior Art

Foldable electronic devices or deformable electronic devices have become one of the topics in the new generation of electronic technology recently, and the demands of integrating the foldable display device into the electronic device are increased accordingly. As the demands of the consumers to the foldable electronic device are getting higher, to achieve the desired product specifications such as deformable effect, life span, and display effect of the foldable display device is one of the directions of the development in the related field.

SUMMARY OF THE DISCLOSURE

An electronic device is disclosed in the present disclosure. The electronic device includes a sensing unit that can be divided into two or more portions. The sensing unit in each of the portions may be driven by a driving circuit of the electronic device to provide various kinds of functions under different modes of the electronic device.

In some embodiments, an electronic device is provided. The electronic device includes a substrate, a sensing unit overlapped with the substrate and including a first sub-unit and a second sub-unit, a first signal input electrically connected to the first sub-unit and a second signal input electrically connected to the second sub-unit. The first sub-unit and the second sub-unit are symmetrical to an axis, and the first signal input and the second signal input are asymmetrical to the axis.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

Figure 1:
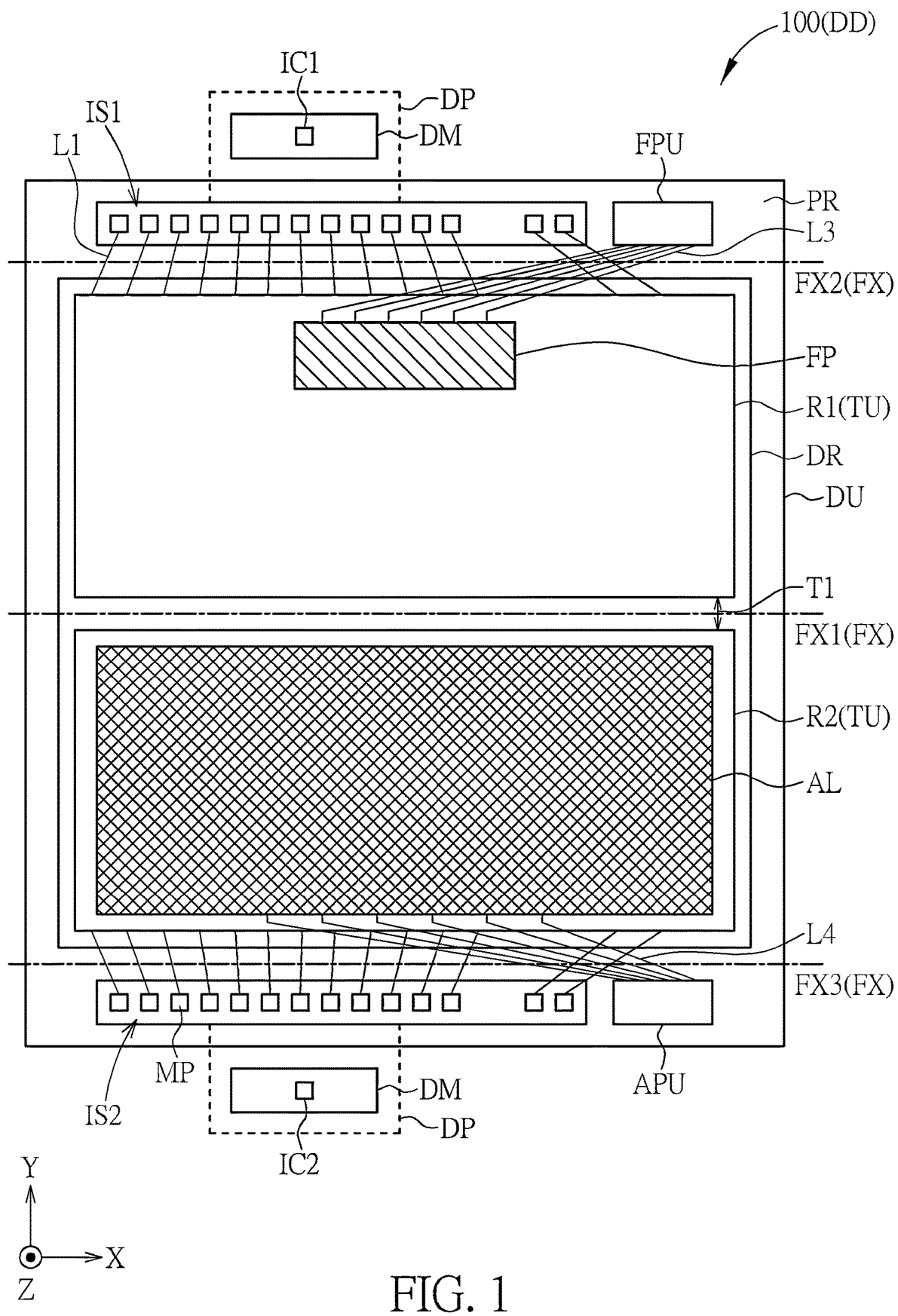
FIG. 1 schematically illustrates a top view of an electronic device according to a first embodiment of the present disclosure.

FIG. 1 schematically illustrates a top view of an electronic device according to a first embodiment of the present disclosure. According to the present embodiment, the electronic device shown in FIG. 1 may be a display device DD, and may for example include laptop, public display, tiled display, vehicle display, touch display, television, surveillance camera, smart phone, tablet computer, light source module, lighting device or other electronic devices applied to the above-mentioned products, but not limited thereto. In some embodiments, the electronic device may include an antenna or sensing device. For example, when the electronic device is an antenna, the display unit in the display device may be replaced with the smallest working unit, but the present disclosure is not limited thereto. In addition, the display device DD in the present embodiment may be a foldable display device 100, and may for example be folded along at least one folding axis FX repeatedly, but not limited thereto. It should be noted that the term "folded" here may represent curved, bent, folded, rolled, flexed, or other kinds of deformation, the present disclosure is not limited thereto. The foldable display device 100 is taken as an example of the electronic device to describe the embodiments of the present disclosure in the following. As shown in FIG. 1, the foldable display device 100 may include three folding axes FX, that is, the foldable display device 100 in the present embodiment may be folded one or more times along at least one of the three bending axes FX, but not limited thereto. In some embodiments, the foldable display device 100 may include one folding axis FX, two folding axes FX, four folding axes FX or more folding axes FX, and the present disclosure is not limited thereto. In addition, the foldable display device 100 may be folded inward or outward according to the design.

In the present embodiment, the display device DD (the foldable display device 100) may include a display unit DU, a touch unit TU and a driving unit DM, wherein the display unit DU and/or the touch unit TU are foldable and include a folding axis. These elements or layers will be detailed in the following.

Figure 2:
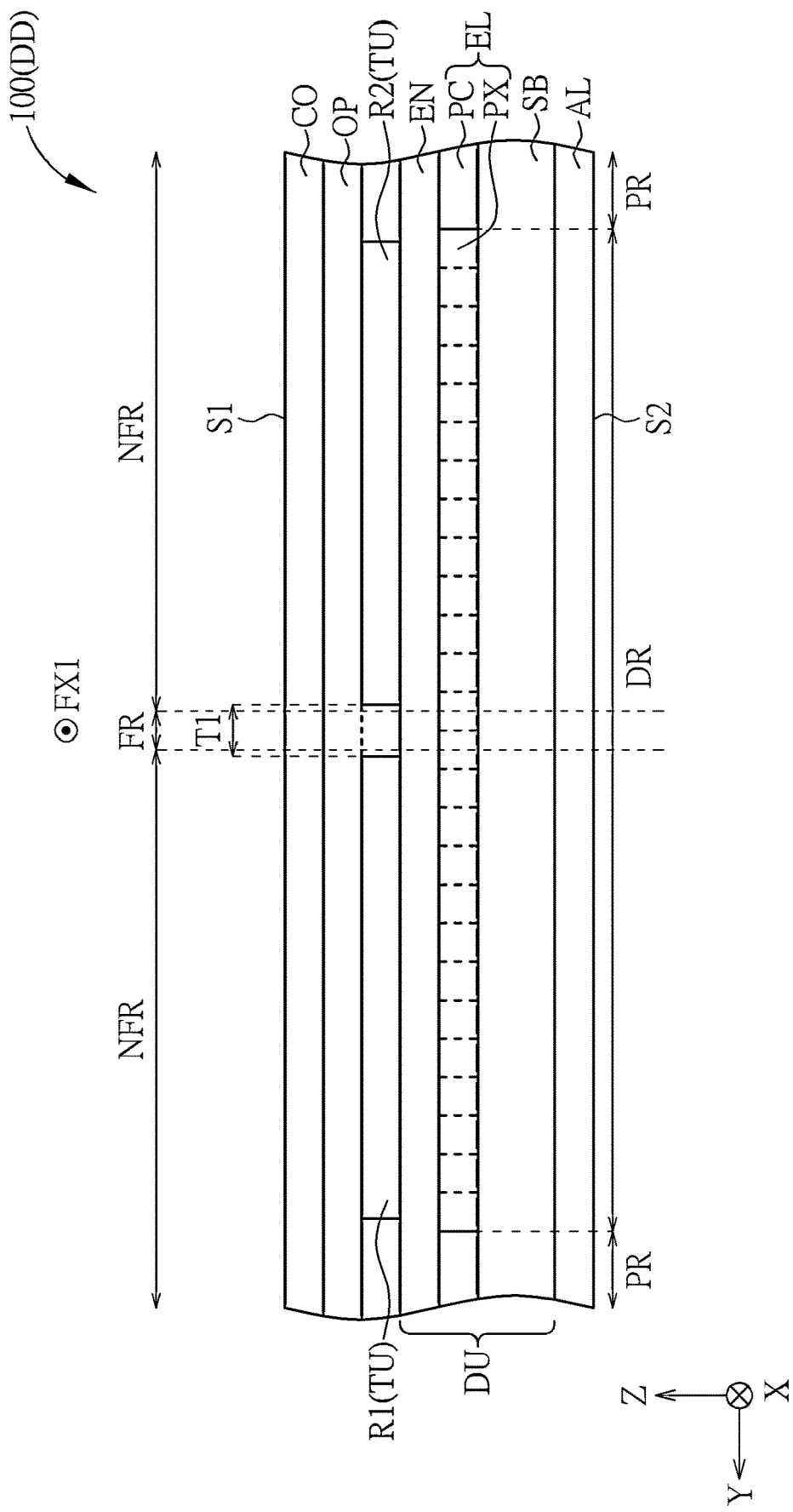
FIG. 2 schematically illustrates a cross-sectional view of an electronic device according to a first embodiment of the present disclosure.

Referring to FIG. 1 as well as FIG. 2, FIG. 2 schematically illustrates a cross-sectional view of an electronic device according to a first embodiment of the present disclosure. In order to simplify the figures, the structure shown in FIG. 2 only illustrates the manner of stacking and disposition of each of the layers or elements, and the thickness or width of each layer is not limited to what is shown in FIG. 2. As shown in FIG. 2, the display unit DU may include a substrate SB, an electrical layer EL and an encapsulation layer EN. The foldable display device 100 may selectively include an optical layer OP and a cover layer CO disposed on the touch unit TU in addition to the above-mentioned layers or elements. The optical layer OP may for example include organic materials or inorganic materials which can improve the optical performance of the foldable display device 100, and the cover layer CO may for example include glass or other materials that can cover the foldable display device 100 to protect the elements or layers in the foldable display device 100, but not limited thereto. The layers and elements included in the foldable display device 100 shown in FIG. 2 may be applied to each of the embodiments in the following, and will not be redundantly described. According to the present embodiment, the substrate SB may be an insulating layer structure with single layer or multi-layers, wherein the insulating layer structure has a supporting function or buffer function. For example, the substrate SB may for example include (but not limited to) an insulating layer, adhesive layer and/or supporting layer (not shown in FIG. 2), wherein the insulating layer may for example include a polyimide (PI) layer or other suitable insulating materials, the supporting layer may for example include polyethylene terephthalate (PET) or other suitable materials, and the adhesive layer may for example include suitable adhesive such that the supporting layer and the insulating layer may be connected to each other, but not limited thereto. In addition, the substrate SB may further include a buffer layer in some embodiments, but not limited thereto.

In the present embodiment, the foldable display device 100 may include a foldable region and a non-foldable region, wherein a portion of the foldable display device 100 located in the foldable region may for example be folded along the folding axis, and the area of the foldable display device 100 other than the foldable region may be the non-foldable region. For example, as shown in FIG. 2, the foldable display device 100 may include a foldable region FR, wherein a portion of the foldable display device 100 located in the foldable region FR may for example be folded along a folding axis FX1, and the area of the foldable display device 100 other than the foldable region FR may be the non-foldable region NFR, but not limited thereto. In some embodiments, when the foldable display device 100 includes another folding axis except for the folding axis FX1, the foldable display device 100 may further include other foldable regions corresponding to the other folding axis.

The electrical layer EL is disposed on the substrate SB and may include electrical elements such as driving elements, light emitting elements and/or light converting elements (not shown in FIG. 2). The driving elements may for example include thin film transistors (TFT) to drive the light emitting elements, but not limited thereto. The light emitting elements may include light emitting diode (LED), but not limited thereto. The light emitting diode may for example include mini light emitting diodes (mini-LED), micro light emitting diodes (micro-LED), organic light emitting diodes (OLED), quantum dot light emitting diodes (QD-LED) or the combinations of the above-mentioned light emitting diodes. In an embodiment, the chip size of the light emitting diode may range from 300 micrometers (μm) to 10 millimeters (mm), the chip size of the mini LED may range from 100 micrometers to 300 micrometers, and the chip size of the micro LED may range from 1 micrometer to 100 micrometers, but not limited thereto. The light converting elements may for example include quantum dot, fluorescent material, phosphorescent material, color filter, other suitable materials or the combinations of the above-mentioned materials, but not limited thereto.

In addition, the display unit DU includes a display region DR and a non-display region PR located outside of the display region DR. In the present embodiment, as shown in FIG. 2, the electrical layer EL may include a plurality of sub-pixels, each of the sub-pixels may for example include a portion of the light converting materials and the light emitting element and the driving element corresponding to the portion of the light converting materials, each of the sub-pixels may for example emit red light, blue light, green light or the light with other suitable colors, the sub-pixels emitting different colors of light may for example form a pixel PX, and the electrical layer EL may include a plurality of pixels PX, but not limited thereto. In other words, the display unit DU in the present embodiment is the entire display element of the foldable display device 100 used for displaying images or pictures, and the display unit DU includes various kinds of electrical elements needed to display images and pictures. The display region DR may for example be defined by the plurality of pixels PX in the electrical layer EL of the display unit DU for display, and the non-display region PR is the region of the electrical layer EL other than the display region DR, wherein the peripheral wires and/or the peripheral circuits PC such as driving elements may be disposed in the non-display region, but not limited thereto. In some embodiments, the foldable display device 100 may be other kinds of display devices such as a liquid crystal display device. When the foldable display device 100 is a liquid crystal display device, the electrical layer EL may for example include layers such as a conductive layer, an insulating layer or liquid crystal layer, and the foldable display device 100 may further include a back light module, but not limited thereto.

Referring to FIG. 1, as mentioned above, the display unit DU of the present embodiment shown in FIG. 1 is foldable. For example, the display unit DU may include a folding axis FX1, a folding axis FX2 and a folding axis FX3 extending along a direction X respectively, and the display unit DU may be folded in a direction Z at the position corresponding to any one of the folding axes, but not limited thereto. In some embodiments, the folding axis FX1, the folding axis FX2 and the folding axis FX3 may for example extend along a direction Y, and the display unit DU may be folded in a direction perpendicular to the direction Y at the position corresponding to any one of the folding axes. In some embodiments, the folding axis FX1, the folding axis FX2 and the folding axis FX3 may extend along the direction X or the direction Y respectively, the present disclosure is not limited thereto. The folding axis FX2 and the folding axis FX3 may for example be located at two opposite sides of the display region DR. The folding angle of the foldable display device 100 may be adjusted according to the demands of the design, for example, the same surfaces (such as the first surface S1-1 and the first surface S1-2 (or display surface) shown in FIG. 3) at two opposite sides of the folding axis FX may substantially be parallel to each other or may include an included angle. In addition, the elements or the layers located in the non-display region PR may be folded to the rear surface (such as the second surface S2) of the display device along the folding axis FX2 and the folding axis FX3, but not limited thereto. It should be noted that the folding directions and folding angles of the foldable display device 100 respectively along the folding axis FX1, the folding axis FX2 and the folding axis FX3 may be the same or different, the present disclosure is not limited thereto. The contents of the display unit DU described in the present embodiment may be applied to the following embodiments, and will not be redundantly described.

Figure 14:
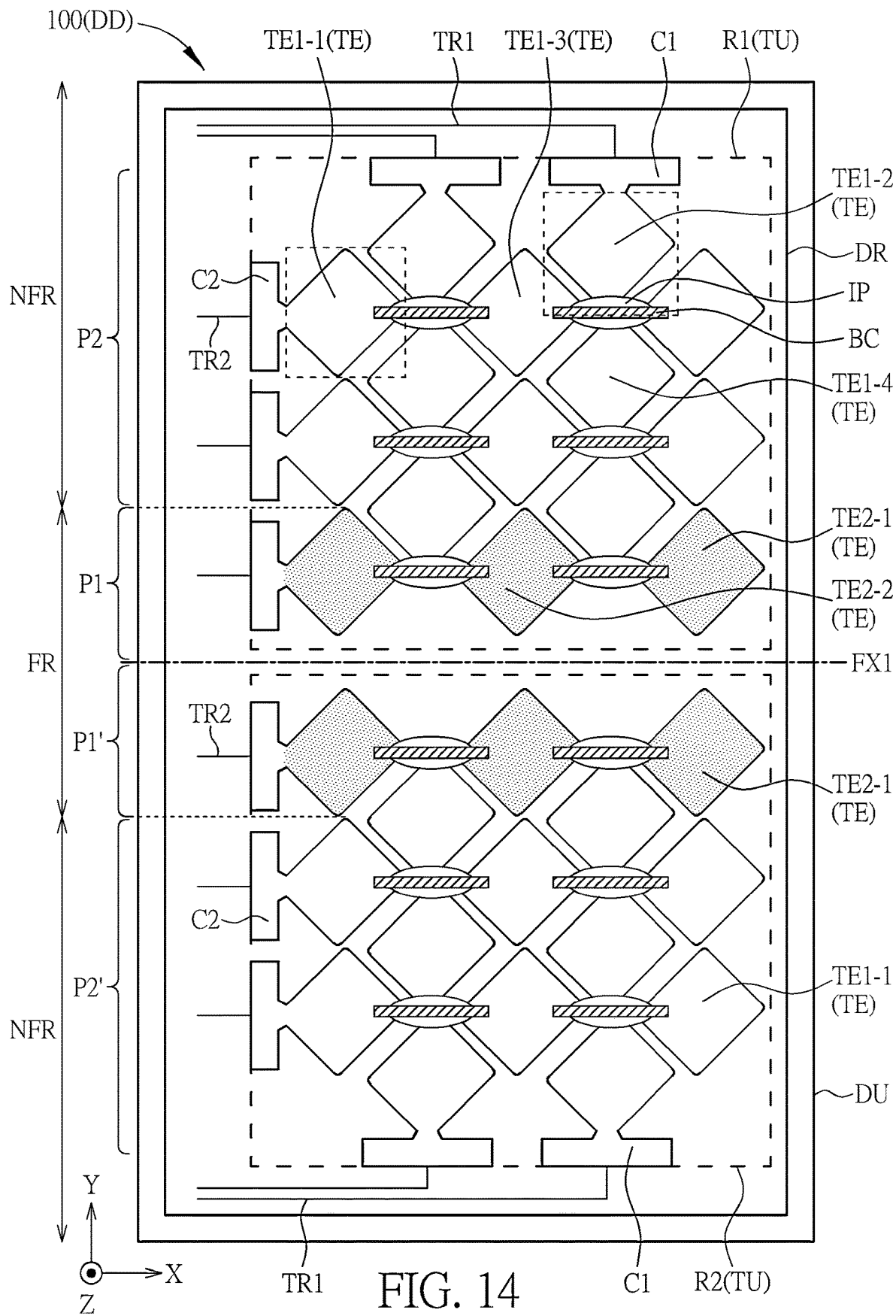
FIG. 14 schematically illustrates a top view of touch electrodes of an electronic device according to a first embodiment of the present disclosure.
Figure 15:
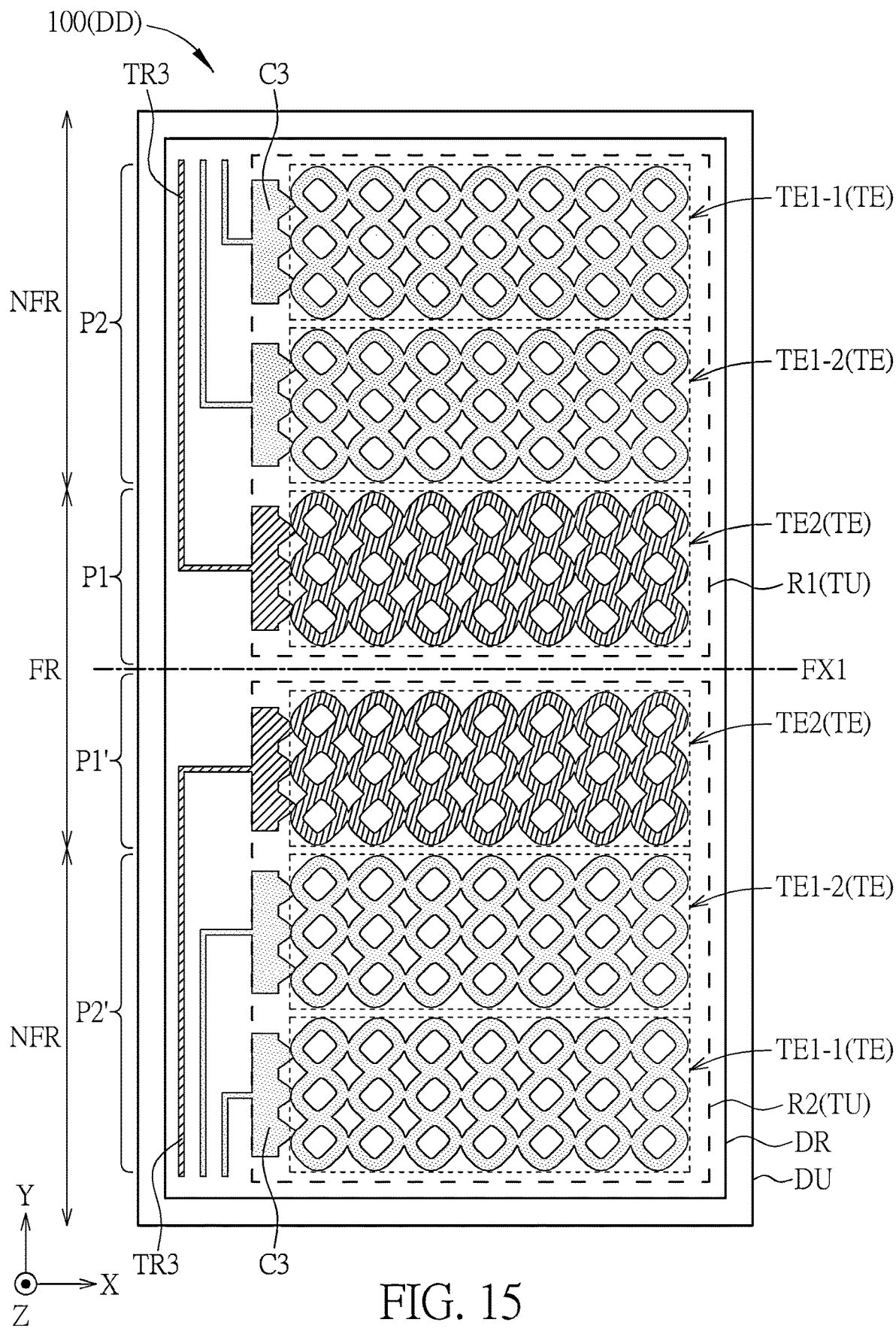
FIG. 15 schematically illustrates a top view of touch electrodes of an electronic device according to a variant embodiment of a first embodiment of the present disclosure.

Referring to FIG. 1 as well as FIG. 2, FIG. 14 and FIG. 15, FIG. 14 schematically illustrates a top view of touch electrodes of an electronic device according to a first embodiment of the present disclosure, and FIG. 15 schematically illustrates a top view of touch electrodes of an electronic device according to a variant embodiment of a first embodiment of the present disclosure. According to the present disclosure, the touch unit TU may be divided into at least two regions. For example, the touch unit TU shown in FIG. 1 is divided into two regions (the first region R1 and the second region R2), but the present disclosure is not limited thereto. In some embodiments, the touch unit TU may include three or more regions. In the present embodiment, as shown in FIG. 1, the touch unit TU may include a first region R1 (also considered as first sub-unit) and a second region R2 (also considered as second sub-unit). When the foldable display device 100 is not folded (that is, the foldable display device 100 is a flat, as shown in FIG. 2), a spacing T1 may be included between the first region R1 and the second region R2. In the top view direction Z of the foldable display device 100, the folding axis FX1 may be located between the first region R1 and the second region R2, but not limited thereto. Specifically, the touch unit TU may include the first region R1 located at a side of the folding axis FX1 and the second region R2 located at another side of the folding axis FX1. The spacing T1 may be overlapped with at least one of the plurality of pixels PX.

In addition, as shown in FIG. 1, the display unit DU may at least partially be overlapped with the touch unit TU in the top view direction Z. Specifically, the first region R1 and the second region R2 of the touch unit TU may respectively overlap a portion of the display unit DU, but not limited thereto. As shown in FIG. 2, the touch unit TU of the present embodiment may be disposed on the display unit DU. Specifically, the first region R1 and the second region R2 of the touch unit TU may be disposed on the display unit DU, but not limited thereto. In some embodiments, the touch unit TU may be integrated into the display unit DU, for example, the touch unit TU may be disposed between the encapsulation layer EN and the electrical layer EL of the display unit DU, but not limited thereto.

According to the present embodiment, the touch unit TU may include a plurality of repeated touch electrodes TE, wherein a portion of the touch electrodes TE sharing the same control unit in the plurality of the touch electrodes may form a region. The first region R1 and the second region R2 may respectively include a plurality of touch electrodes TE. For example, as shown in FIG. 14 and FIG. 15, the touch electrodes TE in the first region R1 may share the same control unit, and the touch electrodes TE in the second region R2 may share the same control unit, but not limited thereto. The touch electrodes TE may for example include a reflective electrode, a transparent electrode or translucent electrode, wherein the reflective electrode may for example include silver, germanium, aluminum, copper, molybdenum, titanium or tin, the transparent electrode may for example include indium tin oxide (ITO) or indium zinc oxide (IZO), and the translucent electrode may for example include metal thin film electrodes such as a magnesium-silver alloy thin film electrode, gold thin film electrode, platinum thin film electrode or aluminum thin film electrode, but not limited thereto.

As shown in FIG. 14, each of the touch electrodes TE (shown in the dotted line of FIG. 14) in the first region R1 and the second region R2 may be a repeated electrode unit (for example, the touch electrode TE1-1, the touch electrode TE1-2, the touch electrode TE2-1 and the touch electrode TE2-2, but only for illustration, each of the touch electrodes shown in FIG. 14 may be regarded as an electrode unit). That is, the touch electrodes TE are the touch elements in the touch unit TU including repeated pattern, and in some embodiments, the adjacent touch electrodes TE may be electrically connected to each other through a bridge BC such that the touch electrodes TE electrically connected to each other may form electrode strings extending along the direction X (for example, the touch electrode TE1-1 and the touch electrode TE1-3) or the direction Y (for example, the touch electrode TE1-2 and the touch electrode TE1-4). It should be noted that although only one bridge BC is shown between the adjacent electrode units of the electrode string in FIG. 14, the present disclosure is not limited thereto. In some embodiments, two or more bridges BC may be included between the adjacent electrode units of the electrode string according to the design of the product. In addition, as shown in FIG. 14, the touch unit TU may include a plurality of first connection portions C1, a plurality of second connection portions C2, a plurality of first transportation lines TR1 and a plurality of second transportation lines TR2. The first connection portions C1 may be electrically connected to the electrode strings extending along the direction Y (for example, the touch electrode TE1-2 and the touch electrode TE1-4), and the second connection portions C2 may be electrically connected to the electrode strings extending along the direction X (for example, the touch electrode TE1-1 and the touch electrode TE1-3). The first transportation line TR1 may transport the signals of the touch electrodes in the electrode strings extending along the direction Y, and the second transportation line TR2 may transport the signals of the touch electrodes in the electrode strings extending along the direction X.

Take the first region R1 as an example, in the present embodiment, the touch electrode TE1-1 and the touch electrode TE1-3 may include the same signal, and the touch electrode TE1-2 and the touch electrode TE1-4 may include the same signal through the electrode strings formed by the bridges BC, and the touch electrode TE1-2 and the touch electrode TE1-3 may include different signals. Therefore, the signal in the first transportation line TR1 and the first connection portion C1 is different from the signal in the second transportation line TR2 and the second connection portion C2. However, because the signal in the first transportation line TR1 and the first connection portion C1 and the signal in the second transportation line TR2 and the second connection portion C2 would be transported to the same control unit (such as the driving circuit), all of the touch electrodes in the region R1 may be regarded to be located in the same region, and will not be defined as the touch electrodes in different regions due to the different signals they received. The definition mentioned above may be applied to the definition of the touch electrodes in the second region R2, and will not be redundantly described.

In addition, the touch unit TU may further include a plurality of insulating portions IP disposed above the bridges BC or below the bridges BC. A plurality of bridges BC may be disposed to reduce the possibility of poor touch due to the breaking of wires. The insulating portion IP may for example include any suitable insulating materials, and may electrically insulate the electrode strings extending along the direction X and the electrode strings extending along the direction Y, but not limited thereto. The first connection portion C1, the second connection portion C2, the first transportation line TR1 and the second transportation line TR2 may have the same or different materials as the touch electrodes, in addition, the first connection portion C1, the second connection portion C2, the first transportation line TR1 and the second transportation line TR2 may be disposed on the same layer or different layers as the touch electrodes, the present disclosure is not limited thereto. In some embodiments, the first transportation line TR1 and the second transportation line TR2 may be the first wire or the second wire in the above-mentioned embodiment. For example, the first transportation line TR1 and the second transportation line TR2 connected to the first region R1 may be the first wire L1 shown in FIG. 1, and the first transportation line TR1 and the second transportation line TR2 connected to the second region R2 may be the second wire L2 shown in FIG. 1, but not limited thereto.

According to the present embodiment, the material of a portion P1 of the touch electrodes TE located in the first region R1 and the material of another portion P2 of the touch electrodes TE located in the first region R1 may be different. Similarly, the material of a portion P1' of the touch electrodes TE located in the second region R2 and the material of another portion P2' of the touch electrodes TE located in the second region R2 may be different. In detail, the material of the portion P1 or the portion P1' of the touch electrodes located in the foldable region FR (such as the touch electrode TE2-1 and the touch electrode TE2-2 shown in FIG. 14) and the material of the another portion P2 or portion P2' of the touch electrodes located in the non-foldable region NFR (such as the touch electrode TE1-1 to the touch electrode TE1-4) may be different in the present embodiment, but not limited thereto. According to the present embodiment, The material of the touch electrode TE1-1 to the touch electrode TE1-4 may for example include indium tin oxide, indium zinc oxide (IZO), aluminum zinc oxide (AZO) or other suitable materials, and the material of the touch electrode TE2 may for example include Ag nano-wire (AGNW), metals, poly(3,4-ethylenedioxythiophene) (PEDOT), carbon nano-tube (CNT) or other suitable conductive materials, but not limited thereto. Because the material of the touch electrodes TE2-1 and the touch electrode TE2-2 near the folding axis FX1 and the material of the touch electrode TE1-1 to the touch electrode TE1-4 are different (in other words, the material of the touch electrode TE2-1 and the touch electrode TE2-2 is folding resistant compared to the material of the touch electrode TE1-1 to the touch electrode TE1-4), the structural strength of the touch unit TU near the foldable region (or near the folding axis FX1) may be improved, and the stability and reliability of the touch display device may be improved.

Similarly, as shown in FIG. 15, each of the touch electrodes TE (shown in the dotted line of FIG. 15) in the first region R1 and the second region R2 may be regarded as a repeated electrode unit (for example, the touch electrode TE1-1, the touch electrode TE1-2, and the touch electrode TE2, but only for illustration). That is, the touch electrodes TE in the touch unit TU are the touch elements having repeated pattern, and the repeated pattern may be separated, but not limited thereto. As shown in FIG. 15, the touch unit TU may include a plurality of third connection portions C3 and a plurality of third transportation lines TR3, wherein the material and disposition of the third connection portions C3 may refer to the first connection portion and the second connection portion mentioned above, and the material and disposition of the third transportation line TR3 may refer to the first transportation line TR1 and the second transportation line TR2 mentioned above, which will not be redundantly described here. Similar to what is shown in FIG. 14, the material of the touch electrode TE2 located in the foldable region FR and the material of the touch electrode TE1-1 and the touch electrode TE1-2 located in the non-foldable region NFR may be different in the present variant embodiment, such that the folding endurance of the structure of the touch unit TU near the foldable region may be improved, and the stability and reliability of the touch display device may thereby be improved.

It should be noted that although the touch electrodes TE1 (including the touch electrode TE1-1 to the touch electrode TE1-4) in the first region R1 and the second region R2 have the same material, and the touch electrodes TE2 (including the touch electrode TE2, the touch electrode TE2-1 and the touch electrode TE2-2) in the first region R1 and the second region R2 have the same material, as shown in FIG. 14 and FIG. 15, the present disclosure is not limited thereto. In some embodiments, the material of the touch electrodes TE1 in the first region R1 may be different from the material of the touch electrodes TE1 in the second region R2, or the material of the touch electrodes TE2 in the first region R1 may be different from the material of the touch electrodes TE2 in the second region R2, but not limited thereto. Besides, in some embodiments, the structure of the touch electrodes shown in FIG. 14 and the structure of the touch electrodes shown in FIG. 15 may be integrated to form the touch electrodes of the foldable display device 100. For example, the structure of the touch electrodes in the first region R1 may refer to the touch electrodes shown in FIG. 14, and the structure of the touch electrodes in the second region R2 may refer to the touch electrodes shown in FIG. 15, or, the touch electrodes in the first region R1 and the second region R2 may respectively include the structures of the touch electrodes shown in FIG. 14 and FIG. 15 simultaneously, but not limited thereto. The description of the touch unit TU, and the type, material and design of the touch electrode TE in the touch unit TU may be applied to each of the embodiments and variant embodiments of the present disclosure, and will not be redundantly described. It should be noted that the mesh-shaped touch electrode structure shown in FIG. 15 is only for illustration, it does not represent the real structure of the touch electrode of the present embodiment.

As shown in FIG. 1, the foldable display device 100 may include driving units DM located outside of the display region DR. The driving units DM may for example be an encapsulation element, and may include a first driving circuit IC1 and a second driving circuit IC2, but not limited thereto. In some embodiments, the first driving circuit IC1 and the second driving circuit IC2 may for example be disposed in the non-display region PR of the foldable display device 100 through a chip on substrate method, but not limited thereto. It should be noted that although it is not shown in FIG. 1, the driving unit DM including the first driving circuit IC1 and the driving unit DM including the second driving circuit IC2 may be connected to each other through a time controller, but not limited thereto. According to the present embodiment, the first driving circuit IC1 of the driving unit DM may drive the first region R1 of the touch unit TU, and the second driving circuit IC2 of the driving unit DM may drive the second region R2 of the touch unit TU. That is, the first region R1 and the second region R2 are separately driven by the driving unit DM, but not limited thereto. It should be noted that "the first driving circuit IC1 may drive the first region R1 of the touch unit TU" mentioned above means that the plurality of the touch electrodes TE in the first region R1 may be driven by the first driving circuit IC1, and "the second driving circuit IC2 may drive the second region R2 of the touch unit TU" means that the plurality of the touch electrodes TE in the second region R2 may be driven by the second driving circuit IC2.

More specifically, as shown in FIG. 1, the foldable display device 100 may include a first signal input IS1 and a second signal input IS2 located outside of the display region DR. For example, as shown in FIG. 1, the first signal input IS1 and the second signal input IS2 may be disposed in the non-display region PR of the foldable display device 100. As shown in FIG. 1, the first signal input IS1 and the second signal input IS2 may respectively be disposed at a side of the corresponding folding axis opposite to the display region DR. In detail, the first signal input IS1 is disposed in the non-display region PR, which is a side of the folding axis FX2 opposite to the display region DR, and the second signal input IS2 is disposed in the non-display region PR, which is a side of the folding axis FX3 opposite to the display region DR, but not limited thereto. In the present embodiment, the driving unit DM may be disposed on a circuit board DP. The driving unit DM may be electrically connected to the first signal input IS1 and the second signal input IS2 respectively through the circuit board DP. The first signal input IS1 and the second signal input IS2 may respectively include a plurality of connection pads MP, wherein the connection pads MP may be electrically connected to the first region R1 of the touch unit TU through a plurality of first wires L1 and electrically connected to the second region R2 of the touch unit TU through a plurality of second wires L2 respectively. The circuit board DP may for example include flexible printed circuit board (FPCB), printed circuit board (PCB) or the combination of the above-mentioned circuit boards, but not limited thereto. The first driving circuit IC1 and the second driving circuit IC2 of the driving unit DM may separately drive the touch electrodes TE in the first region R1 and the second region R2 through the electrical connection or the coupling mentioned above.

The touch unit TU may be turned on by partition, that is, the touch unit TU may be driven by different driving circuits separately. Therefore, the foldable display device 100 of the present embodiment may provide various kinds of operational states and functions. For example, one of the first region R1 and the second region R2 may be turned on, and another one of the first region R1 and the second region R2 may be turned off, or, the first region R1 and the second region R2 may both be turned on or turned off, the present disclosure is not limited thereof. In addition, because the touch electrodes TE in the first region R1 may be driven by the first driving circuit IC1 which is near the first region R1, and the touch electrodes TE in the second region R2 may be driven by the second driving circuit IC2 which is near the second region R2 in the present embodiment, the risk of high impedance caused by long wires (such as the first wire L1 and the second wire L2) may be reduced, and the stability and reliability of the foldable display device 100 may be improved.

It should be noted that the size and shape of the circuit board DP in FIG. 1 and the following figures are only for illustration, it does not represent the real size and shape of the circuit board DP. In addition, the number and the extending direction of the wires in FIG. 1 and the following figures are only for illustration, the present disclosure is not limited thereto. For example, greater or smaller number of the first wires L1 and the second wires L2 may be included in FIG. 1, or, the first wires L1 and the second wires L2 may respectively enter the first region R1 and the second region R2 from different sides of the first region R1 and the second region R2, which is not the extending direction shown in FIG. 1, but not limited thereto. The first wires L1 and the second wires L2 may be disposed on the same surface as the first region R1 and the second region R2 or disposed on the surface different from the first region R1 and the second region R2, the present disclosure is not limited thereto.

The material of the first signal input IS1, the second signal input IS2, the first wires L1 and the second wires L2 may for example include aluminum, copper, tin, nickel, gold, silver, other suitable conductive materials or the combinations of the above-mentioned materials, but not limited thereto. The first wires L1 and the second wires L2 may for example include copper, silver, gold, aluminum, other suitable conductive materials or the combinations of the above-mentioned materials, but not limited thereto. Besides, the first wires L1 and the second wires L2 may include single layer structure or multi-layers structure, the present disclosure is not limited thereto. The material, the disposition way in the foldable display device and the design of the driving unit DM, the first signal input IS1, the second signal input IS2, the first wire L1 and the second wire L2 mentioned above may be applied to the following embodiments of the present disclosure, and will not be redundantly described in the following.

Because the first wires L1 and the second wires L2 do not pass through the folding axis FX1, as shown in FIG. 1, the possibility of breaking of the wires in the foldable region (such as the foldable region FR shown in FIG. 2) may be reduced. In some embodiments, the circuit board DP with a driving unit DM disposed thereon may be folded backward to the rear surface (in other words, the surface not for displaying images or pictures, such as the second surface S2 shown in FIG. 2 and FIG. 3) of the display device along the folding axis FX2 and the folding axis FX3, such that the driving unit DM may be disposed on the second surface S2. In addition, because the portion of the touch electrodes TE in the first region R1 and the second region R2 near the folding axis FX2 and the folding axis FX3 may include different materials such as folding resistant materials, which is mentioned above, the possibility of breaking of the touch electrodes TE in the foldable region due to folding may be reduced, and the stability and reliability of the foldable display device 100 may be improved.

Figure 3:
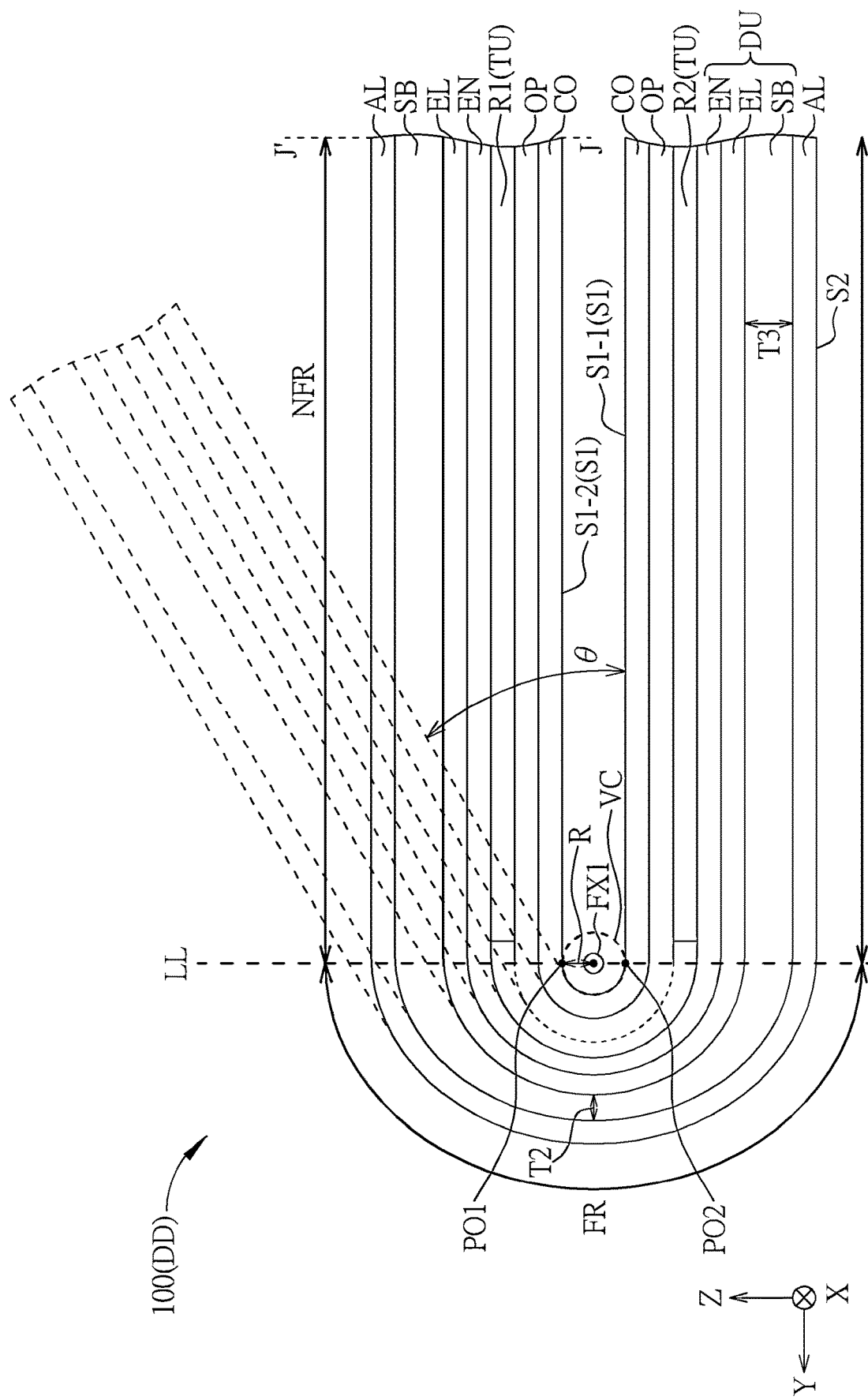
FIG. 3 schematically illustrates a partial cross-sectional view of an electronic device in a folding state according to a first embodiment of the present disclosure.

FIG. 3 schematically illustrates a partial cross-sectional view of an electronic device in a folding state according to a first embodiment of the present disclosure. The materials and disposition ways of the layers shown in FIG. 3 may refer to FIG. 2, and will not be redundantly described here. According to the present embodiment, the foldable display device 100 may be folded repeatedly along the folding axis FX1, wherein when the foldable display device 100 is being folded along the folding axis FX1, a folding angle θ may be included. It should be noted that the folding angle θ may for example be defined as the included angle of the same surface of the foldable display device 100 at two sides of the folding axis (such as the folding axis FX1) when the surface is folded. In the present embodiment, the folding angle θ may for example range from 0 degree to 360 degrees (0o≤folding angle θ≤360 o). For example, when the folding angle θ is 0 degrees, the first surface S1 (such as the display surface) of the foldable display device 100 may for example be divided into a first surface S1-1 and a first surface S1-2 through the folding axis FX1, the first surface S1-1 and the first surface S1-2 of the foldable display device 100 may be close to each other, and the first surface S1-1 and the first surface S1-2 may substantially be parallel to each other. When the folding angle θ is 360 degrees, the first surface S1-1 and the first surface S1-2 of the foldable display device 100 may be away from each other, and the first surface S1-1 and the first surface S1-2 may substantially be parallel to each other. When the folding angle θ is 180 degrees, the foldable display device 100 may be in a not-folded state, and the first surface S1 generally presents a flat surface (that is, the first surface S1-1 and the first surface S1-2 are coplanar, as shown in FIG. 2), but not limited thereto. It should be noted that although the included angle of the first surface S1 (including the first surface S1-1 and the first surface S1-2) may be regarded as the folding angle θ, it is only for illustration. In other embodiments, the folding angle θ may be defined according to other surfaces (for example, the rear surface such as the second surface S2 of the display device, but not limited thereto) of the foldable display device 100.

In addition, according to the present embodiment, as shown in FIG. 3, when the foldable display device 100 is being folded, the thickness of each of the layers in the foldable region FR may be lower than the thickness of the each of the layers in the non-foldable region NFR. For example, as shown in FIG. 3, the thickness T2 of the substrate SB in the foldable region FR is lower than the thickness T3 of the substrate SB in the non-foldable region NFR, but not limited thereto. It should be noted that the thickness T2 and the thickness T3 of the substrate SB is measured when the foldable display device 100 is being folded. Besides, although the thickness of the substrate SB is taken as an example in FIG. 3, the present disclosure is not limited thereto. In other embodiments, when the foldable display device 100 is being folded, the thickness of any layer of the foldable display device 100 in the foldable region FR may be lower than the thickness of the layer in the non-foldable region NFR. The foldable region FR mentioned above may for example be defined by connecting the two ends where the curved surface of each layer in FIG. 3 substantially appeared when the foldable display device 100 is being folded, but not limited thereto. The definition of the folding angle θ may be applied to the following embodiments, and will not be redundantly described.

Figure 4:
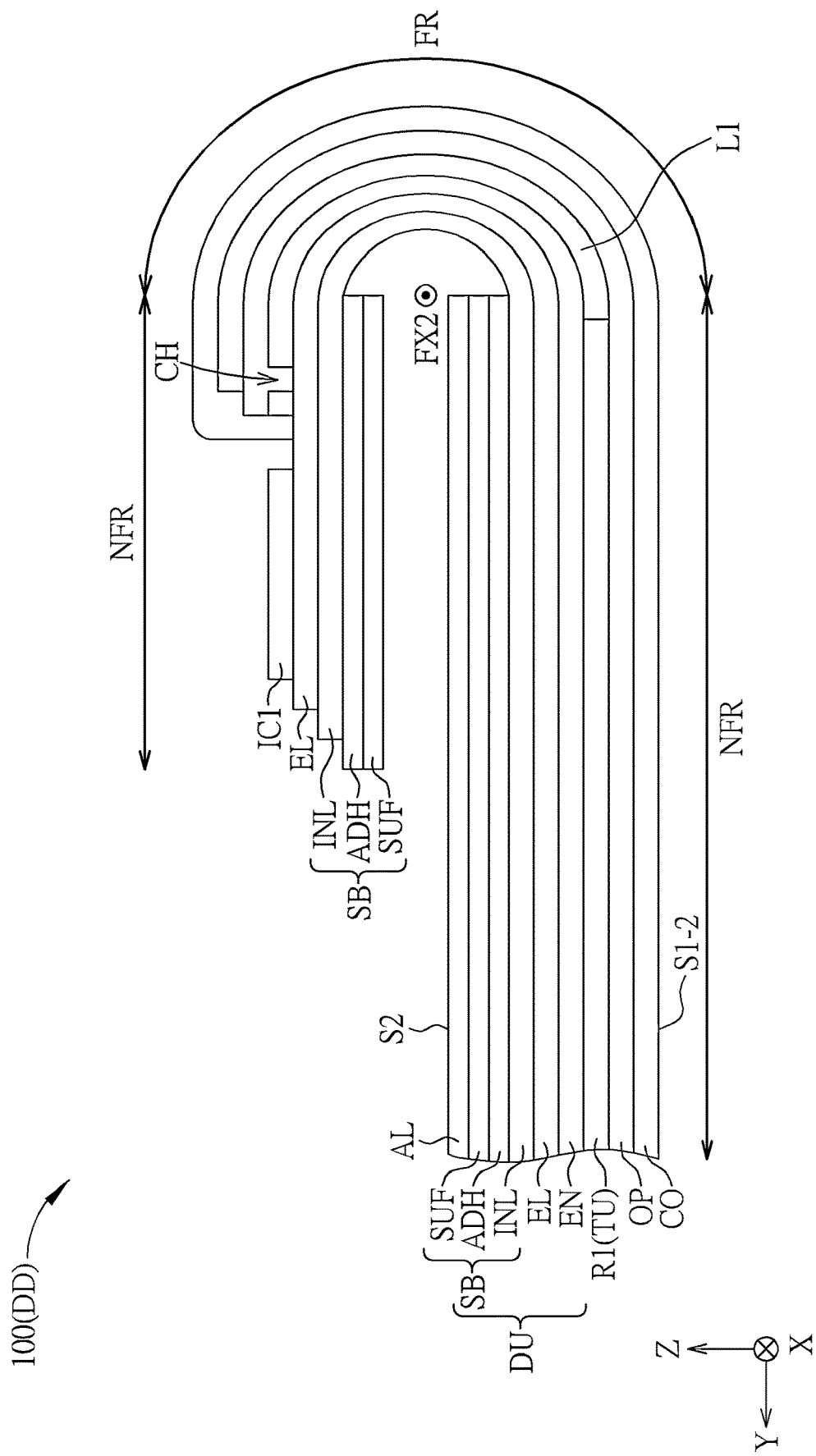
FIG. 4 schematically illustrates another partial cross-sectional view of an electronic device in a folding state according to a first embodiment of the present disclosure.

FIG. 4 schematically illustrates another partial cross-sectional view of an electronic device in a folding state according to a first embodiment of the present disclosure, wherein FIG. 4 schematically illustrates a cross-sectional view of a portion of the foldable display device 100 on the right side of the cut-off line J-J' and near the end of the foldable display device 100. The material and disposition way of each layer shown in FIG. 4 may refer to FIG. 2 and FIG. 3, and will not be redundantly described here. In addition, the substrate SB may include a supporting layer SUF, adhesive layer ADH and an insulating layer INL. As shown in FIG. 4, the non-display region (such as the non-display region PR shown in FIG. 1) of the foldable display device 100 may for example be folded to the rear surface (such as the third surface S3) of the display device along the folding axis FX2. In detail, the substrate SB, the display unit DU, the touch unit TU, the optical layer OP and the cover layer CO of the foldable display device 100 may be folded to the rear surface of display device along the folding axis FX2, and the first region R1 of the touch unit TU may not be folded to the rear surface of the display device.

In the present embodiment, the driving circuits (such as the first driving circuit IC1 and the second driving circuit IC2 mentioned above) controlling the touch unit TU may be electrically connected to the display unit DU (for example, electrically connected to the electrical layer EL), and the display unit DU may be electrically connected to the touch unit TU (for example, a contact via CH may be disposed between the display unit DU and the touch unit TU, or other wires may be disposed to electrically connect the display unit DU and the touch unit TU). Therefore, the operation of the touch unit may be controlled through the driving circuit. For example, as shown in FIG. 4, the first driving circuit IC1 may be electrically connected to the electrical layer EL of the display unit DU, and the touch unit TU may be electrically connected to the electrical layer EL through extra wires and/or contact via (as shown in FIG. 4), such that the operation of the touch unit TU may be controlled by the first driving circuit IC1, but not limited thereto. It should be noted that although FIG. 4 only shows the situation that the non-display region of the display device is folded along the folding axis FX2, the present disclosure is not limited thereto. In some embodiments, the non-display region of the display device may be folded along the folding axis FX3, and the first region R1 in FIG. 4 may be the second region R2, but not limited thereto. The folding conditions mentioned above may be applied to the embodiments and the variant embodiments of the present disclosure, and will not be redundantly described. In addition, the electrical layer EL may be counted from the conductive layer that is the closet to the insulating layer INL, but not limited thereto.

Figure 5:
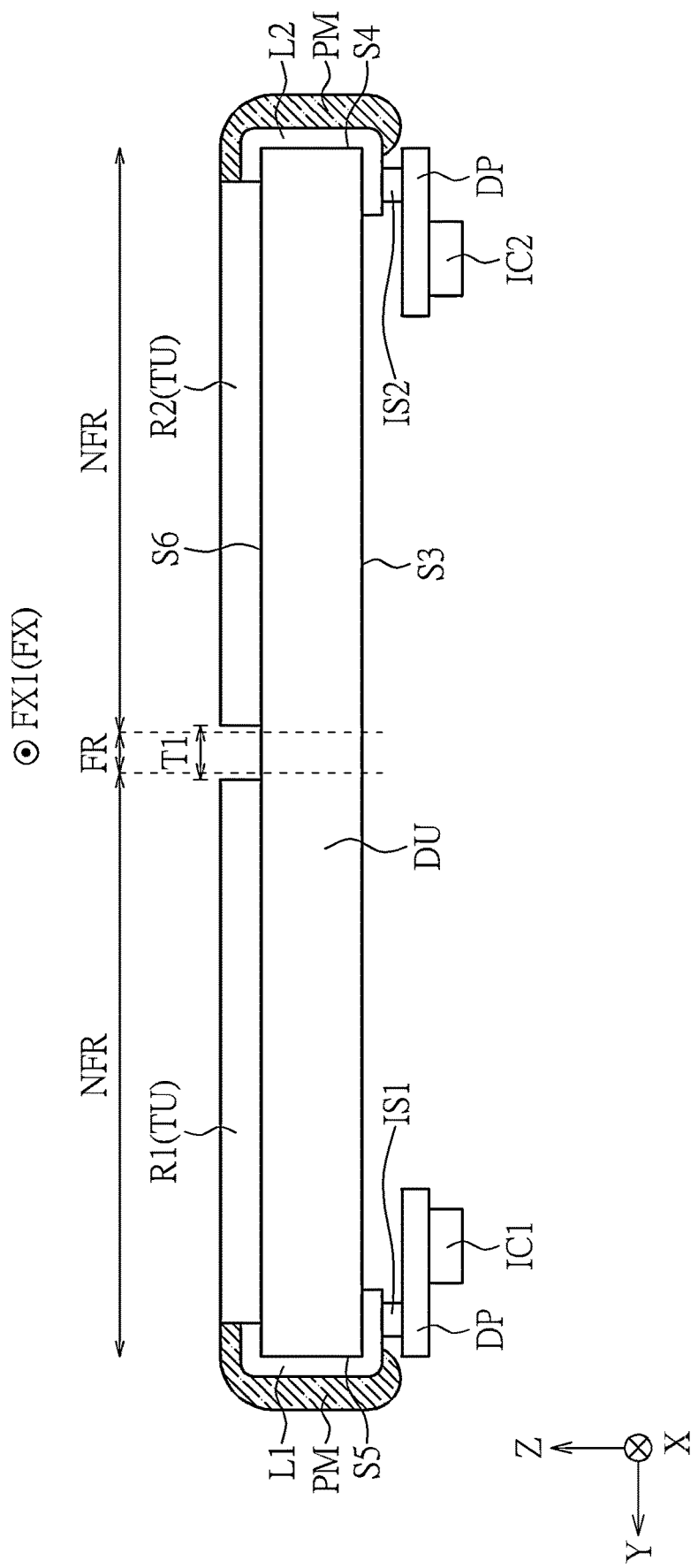
FIG. 5 schematically illustrates a cross-sectional view of an electronic device according to a variant embodiment of a first embodiment of the present disclosure.

FIG. 5 schematically illustrates a top view of touch electrodes of an electronic device according to a variant embodiment of a first embodiment of the present disclosure. In order to simplify the figure, FIG. 5 only schematically shows the structure including the display unit DU and the touch unit TU, and some of the layers are omitted. The elements or layers included in the display unit DU may refer to the description of the display unit DU mentioned above, and will not be redundantly described here. The display unit DU includes a sixth surface S6, a third surface S3 opposite to the sixth surface S6, and a side surface S4 and a side surface S5 connecting the sixth surface S6 and the third surface S3. One of the differences between the variant embodiment shown in FIG. 5 and the first embodiment shown in FIG. 2 is that the non-display region of the display device does not include the folding axis FX2 and the folding axis FX3 in the present variant embodiment. Therefore, the non-display region of the display device may not be folded to the rear surface (such as the third surface S3) of the display device in the present variant embodiment, but not limited thereto. Another one of the differences between the present variant embodiment and the first embodiment shown in FIG. 1 is that the design of the wires is different in the present variant embodiment. According to the present variant embodiment, as shown in FIG. 5, the first wires L1 and the second wires L2 may be disposed on the side surface S4, the side surface S5 and/or the third surface S3 of the display unit DU, and the first signal input IS1, the first driving circuit IC1, the second signal input IS2 and the second driving circuit IC2 may be disposed on the third surface S3 in the present variant embodiment, but not limited thereto. The first wires L1 and the second wires L2 may for example be formed on the side surface S4 and the side surface S5 of the display unit DU through the imprint process or other suitable processes, and the material of the first wires L1 and the second wires L2 may include metal or conductive glue in the present variant embodiment, but the present disclosure is not limited thereto.

In addition, as shown in FIG. 5, the foldable display device 100 may further include protective elements PM disposed on the first wires L1 and the second wires L2, wherein the protective elements PM may cover the first wires L1 and the second wires L2 to protect the first wires L1 and the second wires L2. The protective elements PM may include any suitable insulating materials, but not limited thereto. According to the present variant embodiment, because the first wires L1 and the second wires L2 may be disposed on the side surface S4 of the display unit DU, the area of the peripheral region (such as the non-display region PR shown in FIG. 1) of the foldable display device 100 may be reduced, such that the space configuration of the foldable display device 100 may be more variable and design flexibility of the foldable display device 100 may be improved. The design of wires mentioned in the present variant embodiment may be applied to the above-mentioned embodiments and the following embodiments of the present disclosure, and will not be redundantly described in the following.

As shown in FIG. 5, a spacing T1 may be included between the first region R1 and the second region R2 of the touch unit TU. According to the present variant embodiment, the spacing T1 may be lower than IR (that is, $T1 \leq \pi R$). In some embodiments, the folding state of the foldable display device 100 may be that at least one of the layers of the foldable display device 100 is folded such that the different portions of the surface of the layer may substantially be parallel to each other, for example, as shown in FIG. 3, the first surface S1-1 and the first surface S1-2 of the non-foldable region NFR may be parallel to each other. In such situation, a virtual circle VC may be shown, and the virtual circle VC may be tangent to the first surface S1-1 and the first surface S1-2 of the foldable display device 100 (for example, the virtual circle VC may be tangent to the first surface S1-1 and the first surface S1-2 through the point PO1 and the point PO2). A virtual line LL may pass through the points of tangency (such as the point PO1 and the point PO2) and the center of the virtual circle VC (in the present embodiment, the center of the virtual circle VC may be for example be the folding axis FX1), and the radius of the virtual circle VC may be regarded as the radius of curvature R of the foldable display device 100. It should be noted that although the virtual circle VC and the radius of curvature R mentioned above is defined according to the first surface S1-1 and the first surface S1-2, the present disclosure is not limited thereto. Other surfaces of the foldable display device 100 may be used to define the virtual circle VC and the radius of curvature R. Because the spacing T1 may be lower than IR in the present variant embodiment, the situation of inability to touch or poor touch due to the excessive distance between the first region R1 and the second region R2 may be reduced, and the stability of the foldable display device 100 may be improved. The design of the spacing T1 between the first region R1 and the second region R2 mentioned in the present variant embodiment may be applied to the above-mentioned embodiments and the following embodiments of the present disclosure, and will not be redundantly described in the following.

Moreover, although the structure in FIG. 5 shows that the first region R1 and the second region R2 of the touch unit TU are located in the same layer, the present disclosure is not limited thereto. In some embodiments, the touch electrodes TE corresponding to the first region R1 and the touch electrodes TE corresponding to the second region R2 (shown in FIG. 14 and FIG. 15) may be located in different layers. For example, the touch electrodes TE in the first region R1 may be directly disposed on the display unit DU, and then, a buffer layer may be disposed on the first region R1, after that, the touch electrodes TE in the second region R2 may be disposed on the buffer layer, but not limited thereto. By disposing the first region R1 and the second region R2 on different layers, the first wires L1 electrically connected to the first region R1 and the second wires L2 electrically connected to the second region R2 may be located at different layers, and the area of the non-display region PR of the foldable display device 100 may be reduced, such that the design of the non-display device PR of the foldable display device 100 may be more flexible. The design that the first region R1 and the second region R2 are located in different layers may be applied to the above-mentioned embodiments and the following embodiments of the present disclosure, and will not be redundantly described in the following.

Referring to FIG. 1 again, as shown in FIG. 1, the foldable display device 100 according to the first embodiment of the present disclosure may selectively include a fingerprint identification region FP, wherein the fingerprint identification region FP may partially overlap the first region R1 and the second region R2, but not limited thereto. Besides, although the fingerprint identification region FP is overlapped with the first region R1 in FIG. 1, the present disclosure is not limited thereto. In some embodiments, the fingerprint identification region FP may overlap the second region R2, or, the foldable display device 100 may include two fingerprint identification regions FP respectively overlap the first region R1 and the second region R2, but not limited thereto. According to the present embodiment, the fingerprint identification elements in the fingerprint identification region FP and the touch electrodes TE in the first region R1 (may be the second region R2 in other embodiments) shown in FIG. 1 may be disposed in different layers. For example, the touch electrodes TE in the first region R1 may be located on the fingerprint identification elements in the fingerprint identification region FP, or, the touch electrodes TE in the first region R1 may be located below the fingerprint identification elements in the fingerprint identification region FP, the present disclosure is not limited thereto. The fingerprint identification region FP may be electrically connected to a processing unit FPU through the third wires L3, wherein the processing unit FPU may be disposed at a side of the folding axis (such as the folding axis FX2 shown in FIG. 1) opposite to the display region DR, but not limited thereto. The first wires L1 electrically connected to the first region R1 and the third wires L3 electrically connected to the fingerprint identification region FP may be disposed on different layers.

It should be noted that the disposing relationship between the fingerprint identification region FP and the first region R1 (or the second region R2) is not limited to the above-mentioned contents. In some embodiments, the fingerprint identification elements in the fingerprint identification region FP and the touch electrodes TE in the first region R1 (or the second region R2) may be disposed on the same layer, or, the fingerprint identification elements and the touch electrodes TE may be integrated and share a sensing element, and a time controlling unit may be used to respectively control the sensing function of the fingerprint identification elements and the touch electrodes TE, the present disclosure is not limited thereto.

In some embodiments, the fingerprint identification region FP may include a plurality of fingerprint identification electrodes (not shown) located in the fingerprint identification region FP, wherein the plurality of fingerprint identification electrodes may be electrically connected to the processing unit FPU through one of the third wires L3 respectively. The material of the fingerprint identification electrodes may refer to the material of the touch electrodes TE in the first region R1 and the second region R2, and will not be redundantly described here. In the present embodiment, the "electrode density" may for example be defined as the number of the electrodes in a unit area of the region or defined as the distance between any two adjacent electrodes in an unit area of the region, and according to the present embodiment, the number of the fingerprint identification electrodes (not shown) in a unit area may be greater than the number of the touch electrodes in a unit area, but not limited thereto. It should be noted that the unit area mentioned above may for example be $100\,\mu m * 100\,\mu m$ or $50\,\mu m * 50\,\mu m$, but not limited thereto. In other embodiments, the distance between the adjacent fingerprint identification electrodes may be lower than the distance between the adjacent touch electrodes TE, but not limited thereto. That is, the electrode density of the fingerprint identification electrodes may be greater than the electrode density of the touch electrodes TE. It should be noted that in the present embodiment, the comparison of the electrode density may be based on an unit area of the same size, for example, the electrode density of the fingerprint identification electrodes is greater than the electrode density of the touch electrodes TE mentioned above may be interpreted that the number of the fingerprint identification electrodes in an unit area is great than the number of the touch electrodes TE in an unit area of the same size, but not limited thereto. The examples of the unit area may refer to the above-mentioned contents. Besides, in the present embodiment, the "wire density" may for example be defined as the number of wires in a unit area of the region or defined as the distance between any two adjacent wires in an unit area of the region. It should be noted that the unit area mentioned here may refer to the unit area mentioned above, and will not be redundantly described. As shown in FIG. 1, the wire density of the third wires L3 electrically connected to the fingerprint identification region FP may be greater than the wire density of the first wires L1 electrically connected to the first region R1 and the second wires L2 electrically connected to the second region R2, but not limited thereto. According to the present embodiment, when the user places an object (such as finger) on the fingerprint identification region FP, the third wires L3 may transmit the electrical signal produced from the fingerprint identification electrode to the processing unit FPU to complete fingerprint identification. The above-mentioned embodiments and variant embodiments, and the following embodiments and variant embodiments of the present disclosure may include the fingerprint identification region FP, the third wire L3 and the processing unit FPU or not, and will not be redundantly described in the following.

Figure 16:
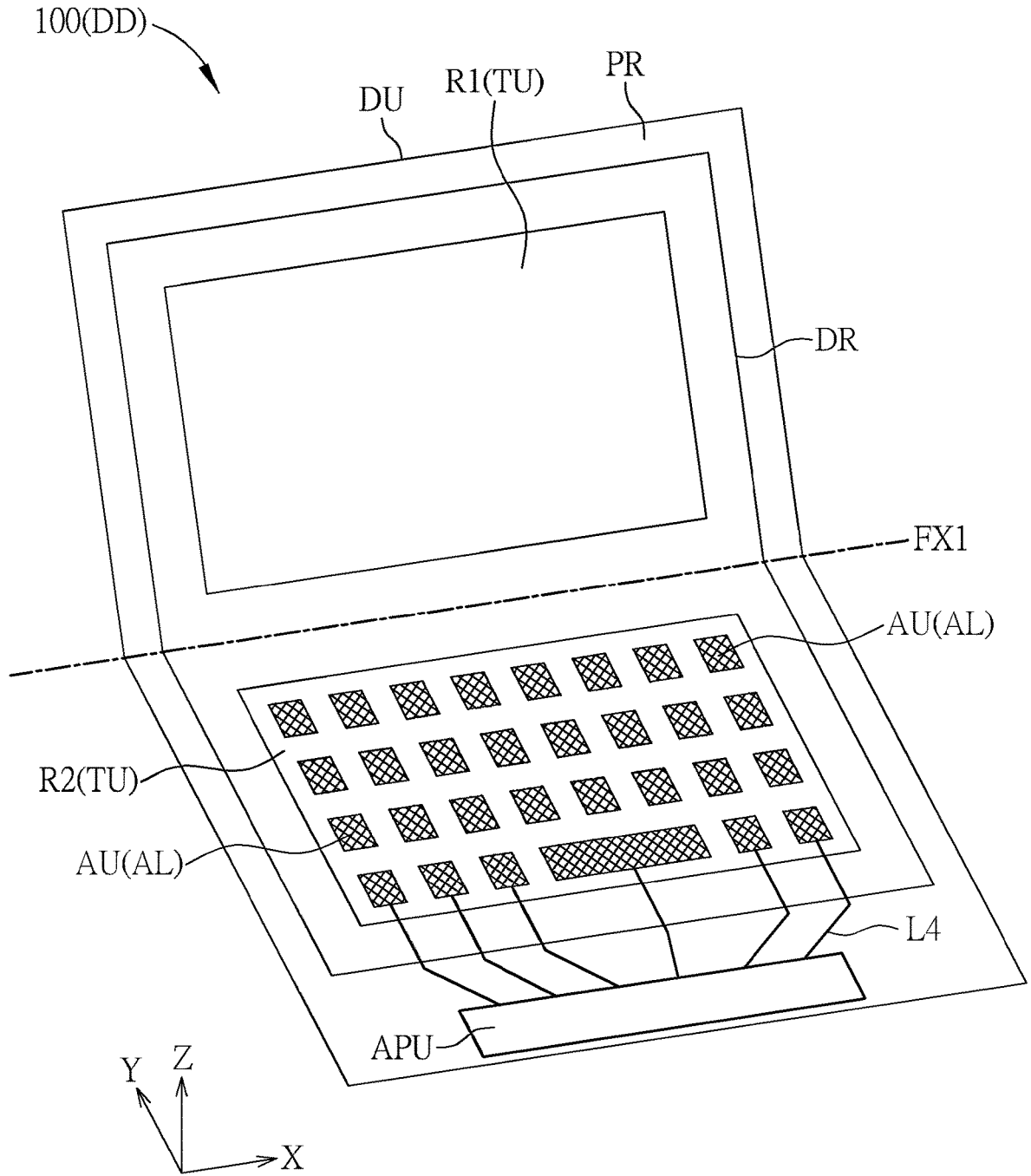
FIG. 16 schematically illustrates a top view of an electronic device including haptic actuators according to a first embodiment of the present disclosure.
Figure 17:
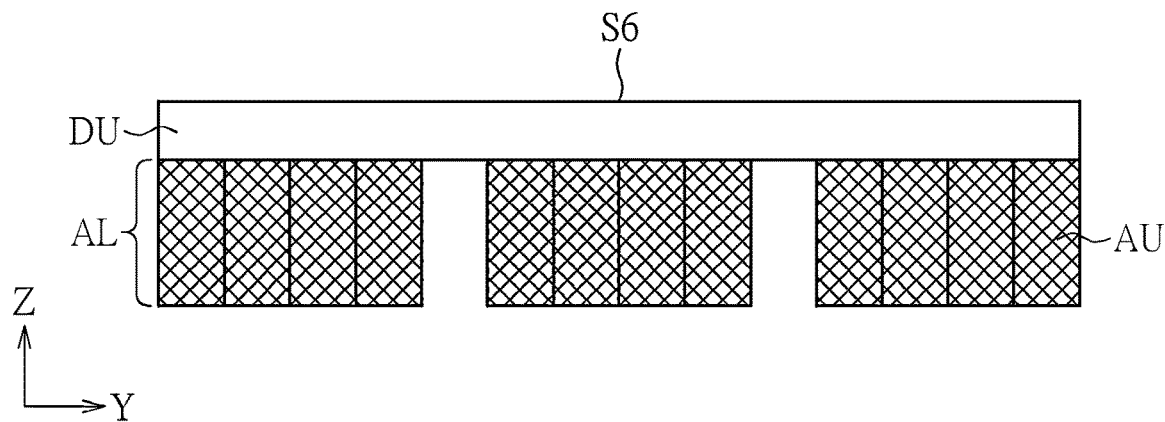
FIG. 17 schematically illustrates a partial cross-sectional view of haptic actuators in an off state according to a first embodiment of the present disclosure.
Figure 18:
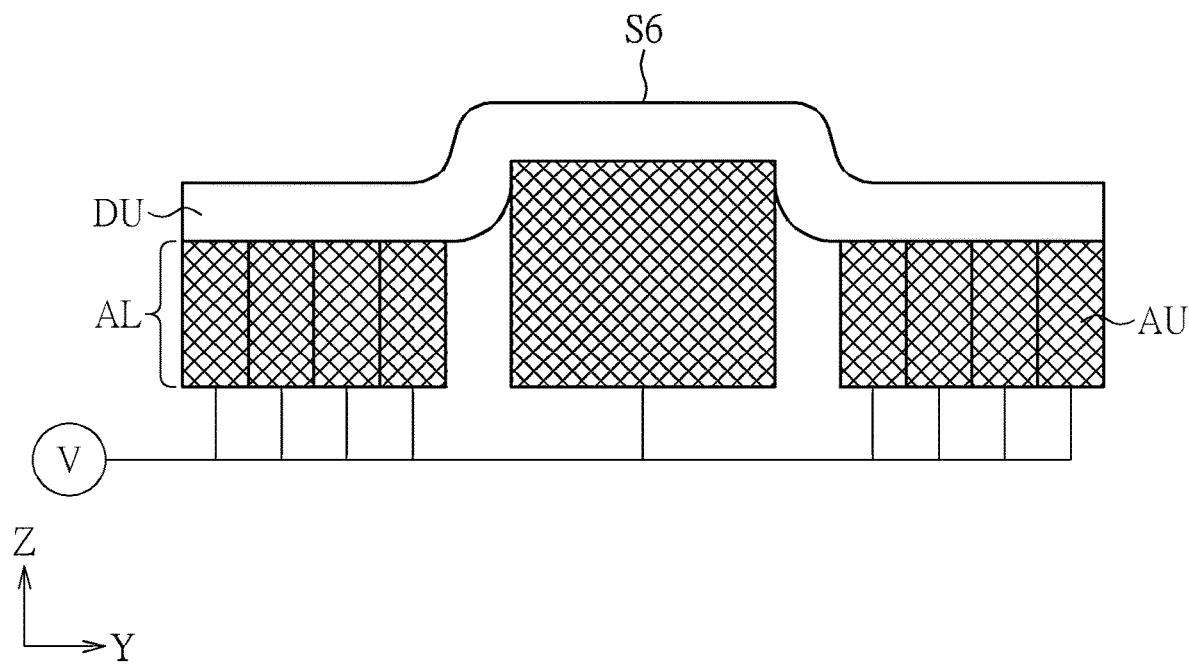
FIG. 18 schematically illustrates a partial cross-sectional view of haptic actuators in an on state according to a first embodiment of the present disclosure.

Referring to FIG. 1, as well as FIG. 2, and FIG. 16 to FIG. 18, FIG. 16 schematically illustrates a top view of an electronic device including haptic actuators according to a first embodiment of the present disclosure, FIG. 17 schematically illustrates a partial cross-sectional view of haptic actuators in an off state according to a first embodiment of the present disclosure, and FIG. 18 schematically illustrates a partial cross-sectional view of haptic actuators in an on state according to a first embodiment of the present disclosure. According to the present embodiment, as shown in FIG. 1, the foldable display device 100 may selectively include an actuating layer AL, wherein the actuating layer AL is overlapped with the second region R2, but not limited thereto. In some embodiments, the foldable display device 100 may not include the actuating layer AL, or the actuating layer AL may be overlapped with the first region R1. As shown in FIG. 2, the actuating layer AL may be disposed below the display unit DU and the touch unit TU, but not limited thereto. In some embodiments, the actuating layer AL may not be disposed below the display unit DU, or, the actuating layer AL may replace the supporting layer (such as the supporting layer SUF shown in FIG. 4) of the substrate SB of the display unit DU to be integrated into the display unit DU, but not limited thereto. The actuating layer AL may be electrically connected to a actuating processing unit APU through the fourth wires L4, wherein the actuating processing unit APU may be disposed at a side of the folding axis (such as the folding axis FX3 shown in FIG. 1) opposite to the display region DR, but not limited thereto. The actuating layer AL may include a single layer structure or multi-layers structure, and may for example include suitable piezoelectric materials or the materials that can be deformed according to temperature and magnetic force, but not limited thereto. The material of the fourth wires L4 may refer to the materials of the first wires L1, the second wires L2 and the third wires L3, and will not be redundantly described here.

According to the present embodiment, the actuating layer AL may include at least one actuating unit AU. As shown in FIG. 15, the actuating layer AL may include a plurality of actuating units AU, and the actuating units AU may respectively be electrically connected to the actuating processing unit APU through one of the fourth wires L4, as shown in FIG. 1 and FIG. 16, but not limited thereto. According to the present embodiment, when the actuating processing unit APU is turned off, or the actuating layer AL is not driven by the actuating processing unit APU, the actuating units AU may be turned off, in other words, the actuating units AU may not be turned on, and the actuating layer AL may for example be regarded as a planar layer or other suitable layers, as shown in FIG. 17, but the present disclosure is not limited thereto. However, when the actuating processing unit APU is turned on or the actuating layer AL is being driven by the actuating processing unit APU, the actuating units AU may be turned on such that the actuating units AU may be deformed. Besides, because the display unit DU is foldable, the portion of the display unit DU corresponding to the deformed actuating units AU may accordingly be deformed. As shown in FIG. 18, when a portion of the actuating units AU are deformed, for example, extending along the direction Z and being raised, the corresponding display unit DU may be affected by the raised actuating units AU, such that the display unit DU may accordingly be raised. In such situation, the user may observe the deformation of the foldable display device 100, for example, the protrusion may be observed by the naked eye, or may be felt by the touch of the fingers.

In the present embodiment, the actuating units AU may for example be disposed in the actuating layer AL with reference to the configuration of the keyboard (as shown in FIG. 16). When the foldable display device 100 is to be used as a computer, the actuating processing unit APU may drive the actuating layer AL to be deformed, such that the user can easily locate when typing. In addition, different actuating units AU may correspond to different symbols, or a plurality of actuating units AU may correspond to the same symbol. Therefore, according to the size of the symbol or the number of the actuating units AU corresponding to the same symbol, the actuating units AU in the present embodiment is not limited to have the same area. Moreover, the area of the actuating layer AL may not be the same as the area of the foldable display device 100 (that is, the area of the top view shown in FIG. 1) in the present embodiment. For example, as shown in FIG. 1, the area of the actuating layer AL may be lower than the area of the display unit DU, but not limited thereto. It should be noted that the design of the actuating layer AL and the actuating units AU of the present disclosure is not limited to the above-mentioned contents, and may include different designs according to the demands.

The processing unit FPU, the driving circuits (including the first driving circuit IC1 and the second driving circuit IC2), the time controller TC and the actuating processing unit APU mentioned above may for example include chips or other suitable control units, but not limited thereto. In addition, the material of these elements may be applied to each of the embodiments and variant embodiments of the present disclosure, and will not be redundantly described in the following.

More embodiments and variant embodiments of the present disclosure will be described in the following. In order to simplify the description, the same layers or elements in the following embodiments would be labeled with the same symbol, and the features thereof will not be redundantly described. The differences between each of the embodiments will be described in detail in the following contents.

Figure 6:
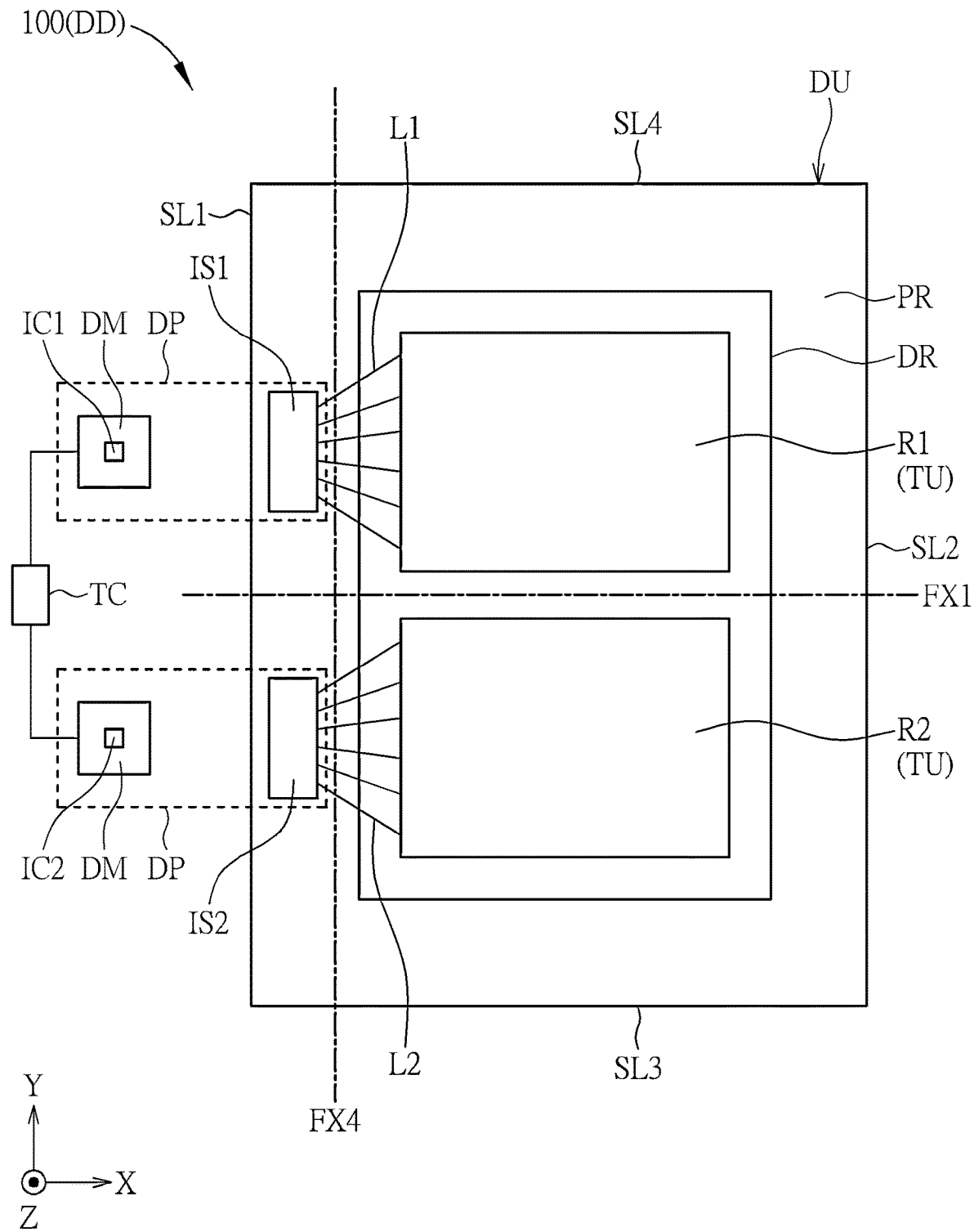
FIG. 6 schematically illustrates a top view of an electronic device according to a second embodiment of the present disclosure.

In the present embodiment, the foldable display device 100 may include a first side SL1, a second side SL2 opposite to the first side SL1, a third side SL3 and a fourth side SL4 opposite to the third side SL3. Referring to FIG. 6, FIG. 6 schematically illustrates a top view of an electronic device according to a second embodiment of the present disclosure. One of the main differences between the present embodiment and the first embodiment shown in FIG. 1 is the position where the signal input is disposed. According to the present embodiment, as shown in FIG. 6, the first signal input IS1 and the second signal input IS2 may be disposed at the first side SL1 of the foldable display device 100, wherein the foldable display device 100 of the present embodiment may include a folding axis FX4 parallel to the first side SL1 and close to the first side SL1, and not include the folding axis FX2 and the folding axis FX3 shown in FIG. 1, but not limited thereto. In some embodiments, the foldable display device 100 may not include the folding axis FX4. The folding axis FX4 may be located between the first signal input IS1, the second signal input IS2 and the display region DR or the touch unit TU in the direction X, wherein the first signal input IS1 and the second signal input IS2 may for example be folded backward to the second surface S2 (or the rear surface of the display device, as shown in FIG. 2 and FIG. 3) of the foldable display device 100 along the folding axis FX4, but not limited thereto.

In addition, the first signal input IS1 and the second signal input IS2 may respectively be electrically connected to the first driving circuit IC1 and the second driving circuit IC2 of the driving units DM through the circuit board DP, wherein the driving units DM shown in FIG. 6 may for example be connected to each other through the time controller TC, such that the time controller TC may respectively control the driving units DM to drive the first region R1 and the second region R2 of the touch unit TU in sequence, but not limited thereto. Because the first signal input IS1 and the second signal input IS2 is disposed at the first side SL1 of the foldable display device 100 in the present embodiment, the area of the non-display region PR may be reduced, and the space configuration of the foldable display device 100 may be improved. In addition, because the first wires L1 and the second wires L2 do not pass through the folding axis FX1, the possibility of breaking of the wires in the foldable region (such as the foldable region FR shown in FIG. 2) may be reduced. Moreover, although the structure shown in FIG. 6 includes two driving circuits (the first driving circuit IC1 and the second driving circuit IC2), the present disclosure is not limited thereto. For example, the driving unit DM may include one of the first driving circuit IC1 and the second driving circuit IC2, wherein the first signal input IS1 and the second signal input IS2 may be electrically connected to the driving circuit, and the driving circuit in the driving unit DM may drive the first region R1 and the second region R2 in sequence (or in a time sequence). The disposition of the first signal input IS1 and the second signal input IS2, and the number design of the driving circuit mentioned above may be applied to the above-mentioned embodiments and the following embodiments, and will not be redundantly described in the following.

Figure 7:
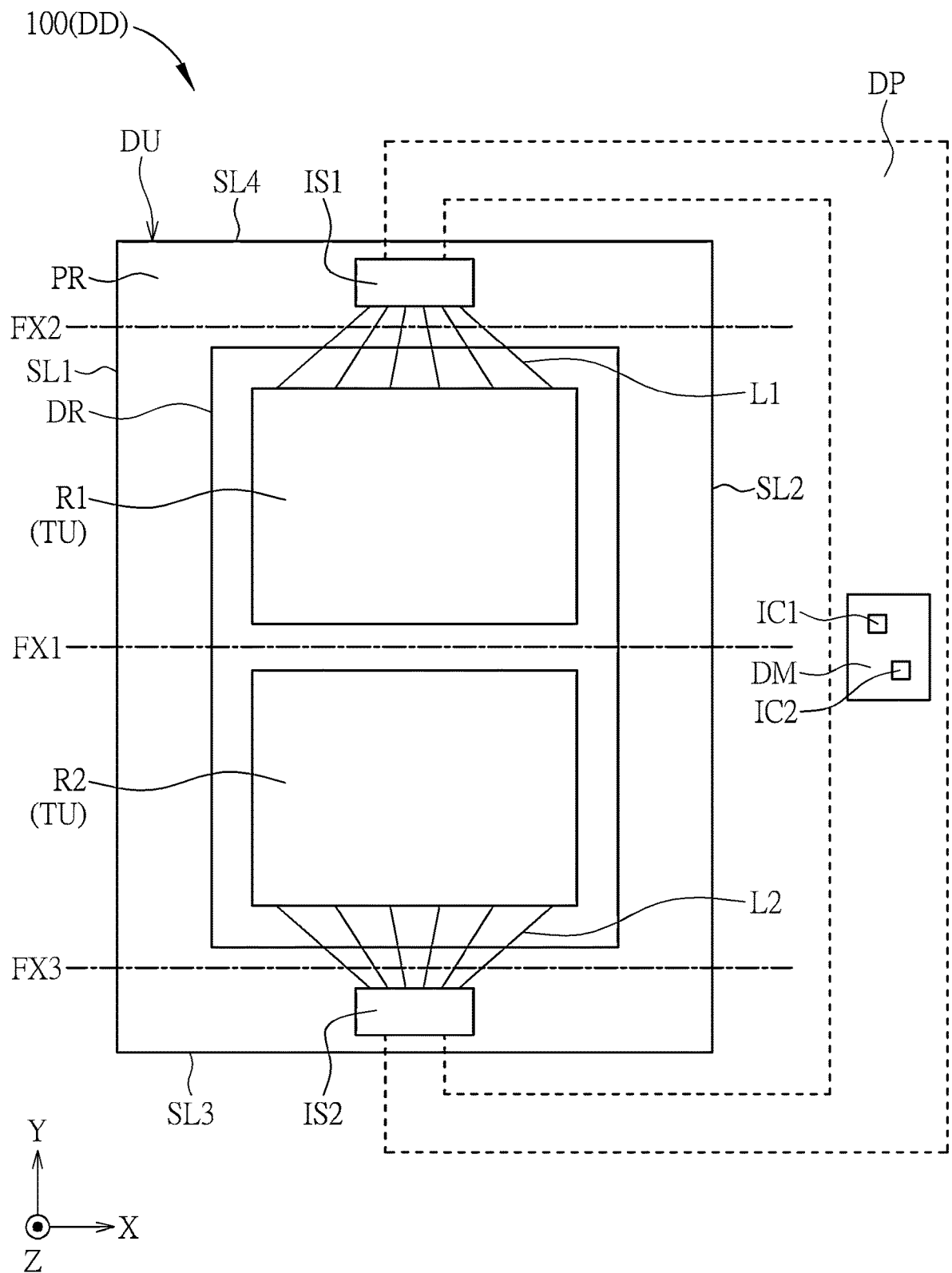
FIG. 7 schematically illustrates a top view of an electronic device according to a third embodiment of the present disclosure.

FIG. 7 schematically illustrates a top view of an electronic device according to a third embodiment of the present disclosure. One of the main differences between the present embodiment and the first embodiment shown in FIG. 1 is the design of the driving unit DM. As shown in FIG. 7, the first driving circuit IC1 and the second driving circuit IC2 may be located in the same driving unit DM in the present embodiment, and the first signal input IS1 and the second signal input IS2 may respectively be electrically connected to the first driving circuit IC1 and the second driving circuit IC2 of the driving unit DM through the circuit board DP, but not limited thereto. In the present embodiment, because the length of the first wires L1 and the second wires L2 may be short, the impedance of the wires may be reduced. In addition, because the first wires L1 and the second wires L2 do not pass through the folding axis FX1, the possibility of breaking of the wires in the foldable region (such as the foldable region FR shown in FIG. 2) may be reduced.

Figure 8:
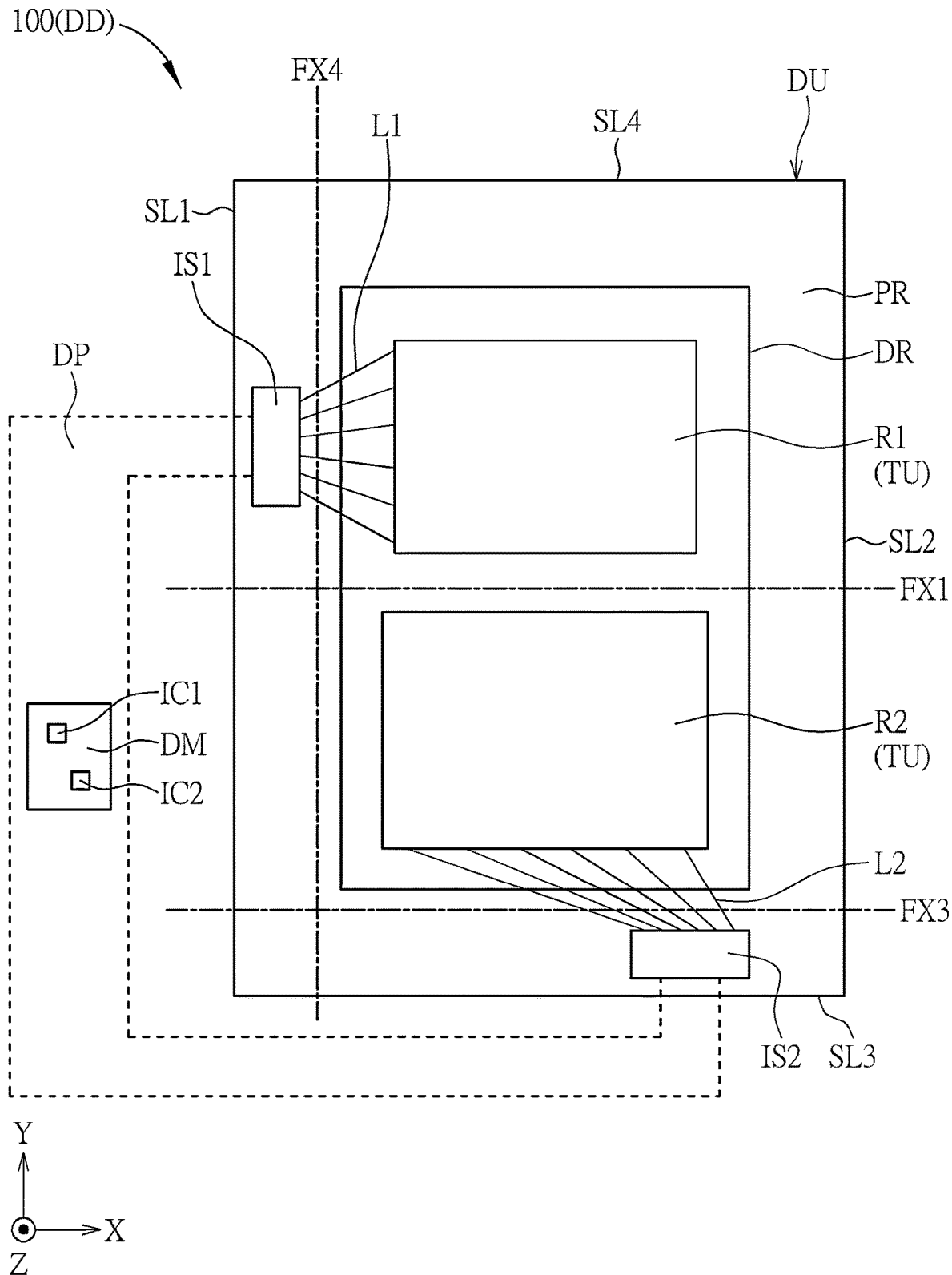
FIG. 8 schematically illustrates a top view of an electronic device according to a fourth embodiment of the present disclosure.

FIG. 8 schematically illustrates a top view of an electronic device according to a fourth embodiment of the present disclosure. One of the differences between the present embodiment and the first embodiment shown in FIG. 1 is the position where the signal inputs are disposed. As shown in FIG. 8, the first signal input IS1 of the foldable display device 100 may be disposed at the first side SL1, and the second signal input IS2 of the foldable display device 100 may be disposed at the third side SL3, wherein the first side SL1 may be the longer side of the foldable display device 100, and the third side SL3 may be the shorter side of the foldable display device 100 in the present embodiment, but not limited thereto. In some embodiments, the first side SL1 may be the shorter side of the foldable display device 100, and the third side SL3 may be the longer side of the foldable display device 100, or, the first signal input IS1 may selectively be disposed at the second side SL2, but not the first side SL1 shown in FIG. 1, of the foldable display device 100, but not limited thereto. Because the length of the first wires L1 and the second wires L2 may be short in the present embodiment, the impedance of the wires may thereby be reduced. In addition, because the first wires L1 and the second wires L2 do not pass through the folding axis FX1, the possibility of breaking of the wires in the foldable region (such as the foldable region FR shown in FIG. 2) may be reduced. Besides, as shown in FIG. 8, the area of the first region R1 of the touch unit TU may be lower than the area of the second region R2 of the touch unit TU in the present embodiment, but not limited thereto. In some embodiments, the area of the first region R1 may be greater than the area of the second region R2. Accordingly, the area of the first region R1 of the touch unit TU may be different from or the same as the area of the second region R2 of the touch unit TU according to different demands of the design. The relationship between the area of the first region R1 and the area of the second region R2 may be applied to the above-mentioned embodiments and the following embodiments of the present disclosure, and will not be redundantly described in the following.

Figure 9:
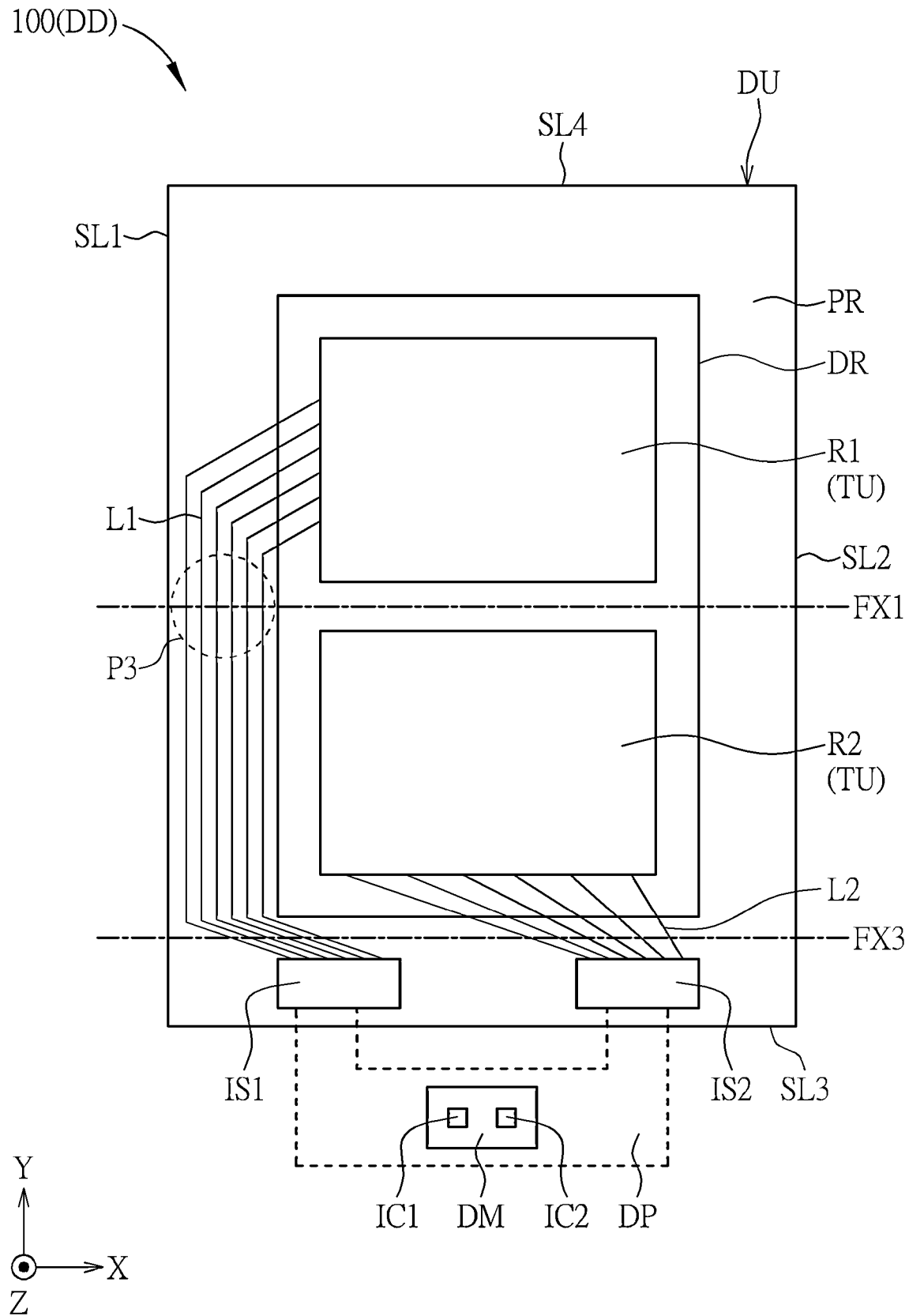
FIG. 9 schematically illustrates a top view of an electronic device according to a fifth embodiment of the present disclosure.

FIG. 9 schematically illustrates a top view of an electronic device according to a fifth embodiment of the present disclosure. One of the differences between the present embodiment and the first embodiment shown in FIG. 1 is the position where the signal inputs are disposed. As shown in FIG. 9, the first signal input IS1 and the second signal input IS2 may be disposed at the third side SL3 of the foldable display device 100, but not limited thereto. In some embodiments, the first signal input IS1 and the second signal input IS2 may be disposed at the fourth side SL4 of the foldable display device 100. According to the present embodiment, the foldable display device 100 may include the folding axis FX1, and may selectively include the folding axis FX3. The foldable display device 100 may for example be folded along the folding axis FX3, and the first signal input IS1 and the second signal input IS2 may be folded to the second surface S2 (or the rear surface of the display device shown in FIG. 2 and FIG. 3) of the foldable display device 100, but not limited thereto. In the present embodiment, because the first signal input IS1 and the second signal input IS2 are disposed at the same side of the foldable display device 100, the area of the non-display region PR of the foldable display device 100 may be reduced, and the space configuration of the foldable display device 100 may be improved. In addition, because the first wires L1 electrically connected to the touch unit TU may pass through the folding axis FX1 (in other words, the first wires may pass through the foldable region FR shown in FIG. 2) in the present embodiment, a portion of the first wires L1 located in the foldable region may include different designs, but not limited thereto. Moreover, although the second wires L2 shown in FIG. 9 is disposed in the non-display region PR, distributed along the first side SL1, and electrically connected to the second region R2, the present disclosure is not limited thereto. In some embodiments, the second wires L2 may for example be located in a different layer from the first wires L1, and the second wires L2 may for example pass above or below the first region R1 and be electrically connected to the second region R2, but not limited thereto.

Figure 10:
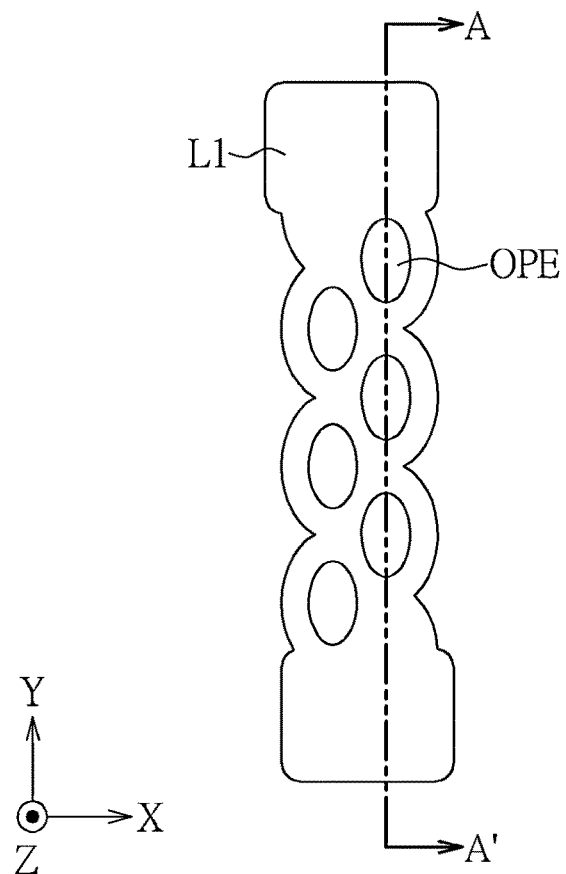
FIG. 10 schematically illustrates a top view of a portion of wires of an electronic device according to a fifth embodiment of the present disclosure.

FIG. 10 schematically illustrates a top view of a portion of wires of an electronic device according to a fifth embodiment of the present disclosure. For example, the first wire L1 shown in FIG. 10 may be the first wires L1 in the region P3 shown in FIG. 9, wherein the first wires L1 in the region P3 may represent the portion of the first wires L1 corresponding to the foldable region (such as the foldable region FR shown in FIG. 2). It should be noted that the range of the defined region P3 shown in FIG. 9 is only for illustration, the present disclosure is not limited thereto. Besides, the first wire L1 shown in FIG. 10 may be the second wire L2 in other embodiments, the present disclosure is not limited thereto.

As shown in FIG. 10, the first wire L1 may include a plurality of opening OPE, wherein the plurality of opening OPE may for example be disposed along the direction Y. The plurality of opening OPE may also be arranged in multiple rows, for example, the first wire L1 may include two rows of opening OPE in FIG. 10, but not limited thereto. In some embodiments, the plurality of opening OPE may be arranged on the first wire L1 in any suitable way. Besides, although the shape of the plurality of opening OPE in FIG. 10 is circular, the present disclosure is not limited thereto. For example, the shape of the plurality of opening OPE may include an arc, other angular shapes, or any suitable shape, and each of the plurality of opening OPE may include different shapes or include the same shape, the present disclosure is not limited thereto. According to the present embodiment, when the foldable display device 100 is being folded along the folding axis FX1, the effect of the stress to the first wires L1 may be reduced by the plurality of opening OPE, and the possibility of breaking of the first wires L1 located in the foldable region (such as the foldable region FR) may be reduced.

It should be noted that the design that the first wires L1 include the plurality of opening OPE mentioned above may not be limited to be applied to the first wires in the region P3. For example, the wires may include the same design as long as there is a folding axis (such as the folding axis FX2 and the folding axis FX3 shown in FIG. 1), but not limited thereto.

Figure 11:
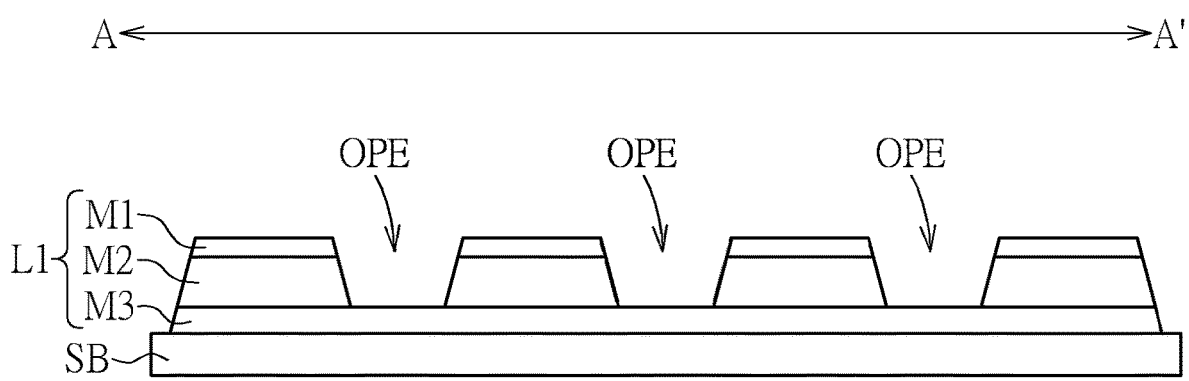
FIG. 11 schematically illustrates a cross-sectional view of a portion of wires shown in FIG. 10 along the line A-A'.

FIG. 11 schematically illustrates a cross-sectional view of a portion of wires shown in FIG. 10 along the line A-A'. In order to simplify the figures, FIG. 11 and the following FIG. 12 and FIG. 13 only show the substrate SB and the first wire L1, and the layers between the substrate SB and the first wire L1 are omitted. It should be noted that although FIG. 11 to FIG. 13 only show the structure of the first wire L1, the present disclosure is not limited thereto. In some embodiments, the second wire L2, the third wire L3 and the fourth wire L4 may include the same structure shown in FIG. 11 to FIG. 13. As shown in FIG. 11, the first wire L1 may include a structure formed by the stacking of a first metal layer M1, a second metal layer M2 and a third metal layer M3, wherein the first metal layer M1 and the third metal layer M3 may include titanium (Ti), and the second metal layer M2 may include aluminum (Al). Therefore, the first wire L1 may for example be a Ti/Al/Ti three-layer structure, but not limited thereto. It should be noted that although the first wire L1 is formed of three metal layers in FIG. 11, the present disclosure is not limited thereto. In some embodiments, the first wire L1 may be formed of more metal layers or fewer metal layers.

In the present embodiment, the plurality of opening OPE may for example be formed by removing a portion of the first metal layer M1 and the second metal layer M2, but not limited thereto. In some embodiments, the plurality of opening OPE may for example be formed by removing a portion of the first metal layer M1, the second metal layer M2, and the third metal layer M3. When the plurality of opening OPE is formed by removing a portion of the first metal layer M1 and the second metal layer M2, the third metal layer M3 may be seen by viewing the plurality of opening OPE in the top view direction Z. When the plurality of opening OPE is formed by removing a portion of the first metal layer M1, the second metal layer M2, and the third metal layer M3, the layer below the first wire L1 may be seen by viewing the plurality of opening OPE in the top view direction Z.

Figure 12:
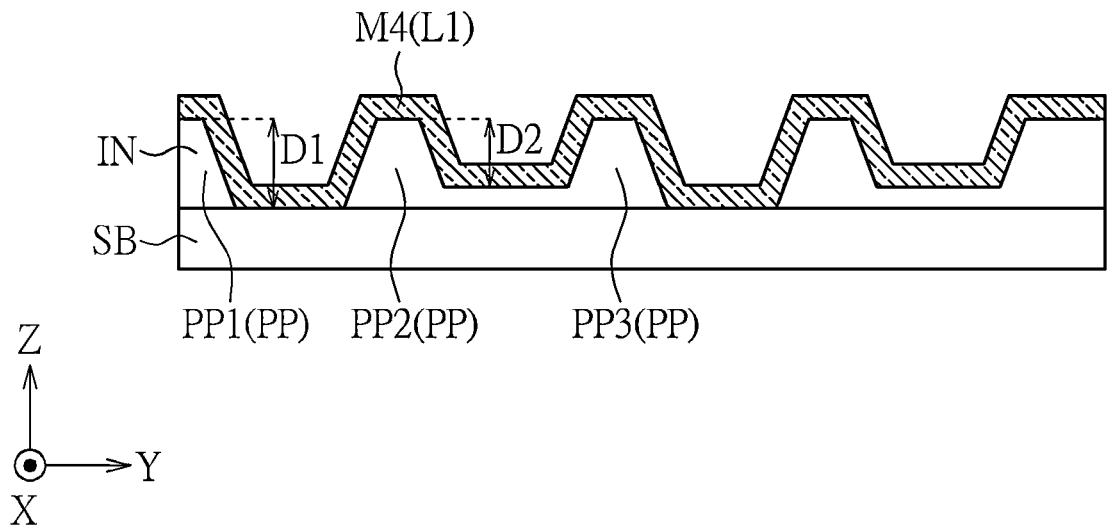
FIG. 12 schematically illustrates a cross-sectional view of a portion of wires of an electronic device according to a variant embodiment of a fifth embodiment of the present disclosure.

FIG. 12 schematically illustrates a cross-sectional view of a portion of wires of an electronic device according to a variant embodiment of a fifth embodiment of the present disclosure. One of the differences between the variant embodiment shown in FIG. 12 and the embodiment shown in FIG. 11 is that the wires close to the folding axis may include different designs. As shown in FIG. 12, the formation of the wires in the present variant embodiment may for example include forming an insulating layer IN on the substrate SB at first, forming a plurality of protruding structures PP (such as the protruding structure PP1, the protruding structure PP2 and the protruding structure PP3 shown in FIG. 12) with the same height or different heights after the insulating layer IN is patterned, and disposing the fourth metal layer M4 on the insulating layer IN. Specifically, in the present embodiment, a portion of the fourth metal layer M4 may be disposed between the adjacent two of the protruding structures PP and in contact with the layer directly below the insulating layer IN (not shown), and a portion of the fourth metal layer M4 may be disposed on the side surface and the top surface of the protruding structures PP. The first wire L1 may include a folding design due to the protruding structures PP of the insulating layer IN. Besides, the heights included between the adjacent two of the protruding structures PP may be different, for example, the height D1 (the height included between the protruding structure PP1 and the protruding structure PP2) may be greater than the height D2 (the height included between the protruding structure PP2 and the protruding structure PP3) in FIG. 12, wherein the height is defined as the shortest distance from the top surfaces of the adjacent two of the protruding structures PP to the surface which is the closest to the bottom surface, but not limited thereto. The length of the wires may be adjusted by the protruding structures PP including different heights to reduce the possibility of breaking of the wires. The material of the fourth metal layer M4 may refer to the first metal layer M1 to the third metal layer M3 in the above-mentioned embodiment, and will not be redundantly described here. In addition, the insulating layer IN may for example include silicon oxide, silicon nitride or other suitable insulating materials, but not limited thereto. The material of the insulating layer IN may be applied to the insulating layers in the following embodiments or variant embodiments, and will not be redundantly described in the following.

Figure 13:
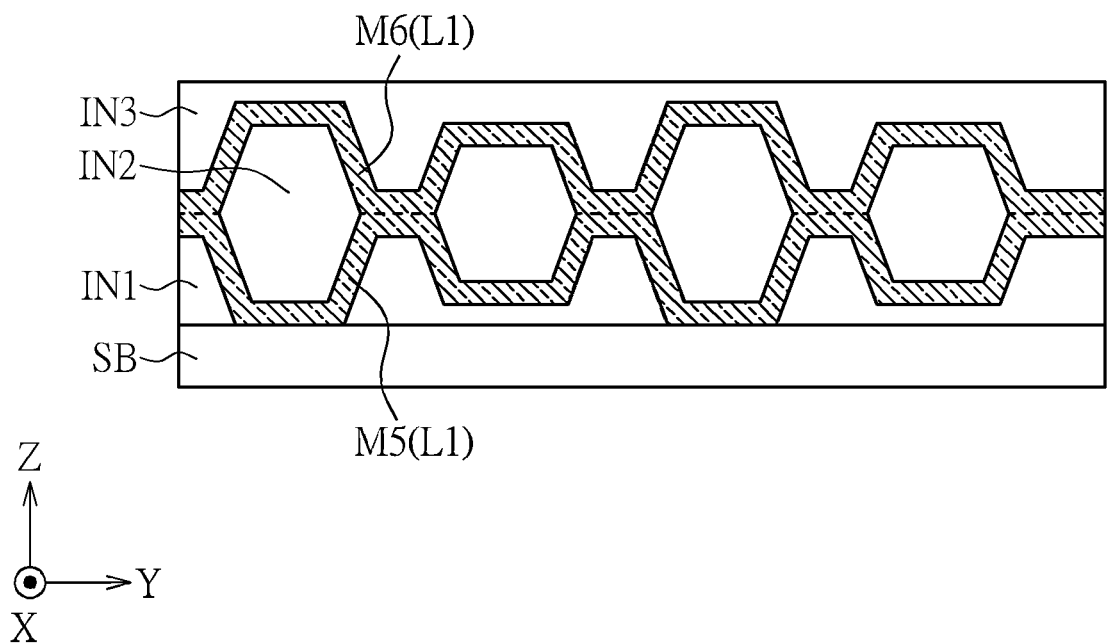
FIG. 13 schematically illustrates a cross-sectional view of a portion of wires of an electronic device according to another variant embodiment of a fifth embodiment of the present disclosure.

FIG. 13 schematically illustrates a cross-sectional view of a portion of wires of an electronic device according to another variant embodiment of a fifth embodiment of the present disclosure. One of the differences between the variant embodiment shown in FIG. 13 and the embodiment shown in FIG. 11 is that the wires close to the folding axis may include different designs. As shown in FIG. 13, the formation of the wires in the present variant embodiment may for example include forming an insulating layer IN1 on the substrate SB at first, disposing a fifth metal layer M5 on the insulating layer IN1 after the insulating layer IN1 is patterned, forming an insulating layer IN2 on the fifth metal layer M5, patterning the insulating layer IN2 to expose a portion of the fifth metal layer M5, forming a sixth metal layer M6, and disposing an insulating layer IN3 on the sixth metal layer M6. According to the present variant embodiment, because the wires may include folding design, the possibility of breaking of the wires due to the effect of the stress may be reduced when the foldable display device 100 is being folded. In addition, because the wires may include the fifth metal layer M5 and the sixth metal layer M6 in the present variant embodiment, when one of the fifth metal layer M5 and the sixth metal layer M6 is broken due to the effect of the stress, the wires can still function normally since another one of the fifth metal layer M5 and the sixth metal layer M6 is not broken.

The design that can reduce the possibility of breaking of the wires close to the folding axis described in the above-mentioned embodiments and variant embodiments may be applied to other embodiments and variant embodiments of the present disclosure, and will not be redundantly described.

Figure 19:
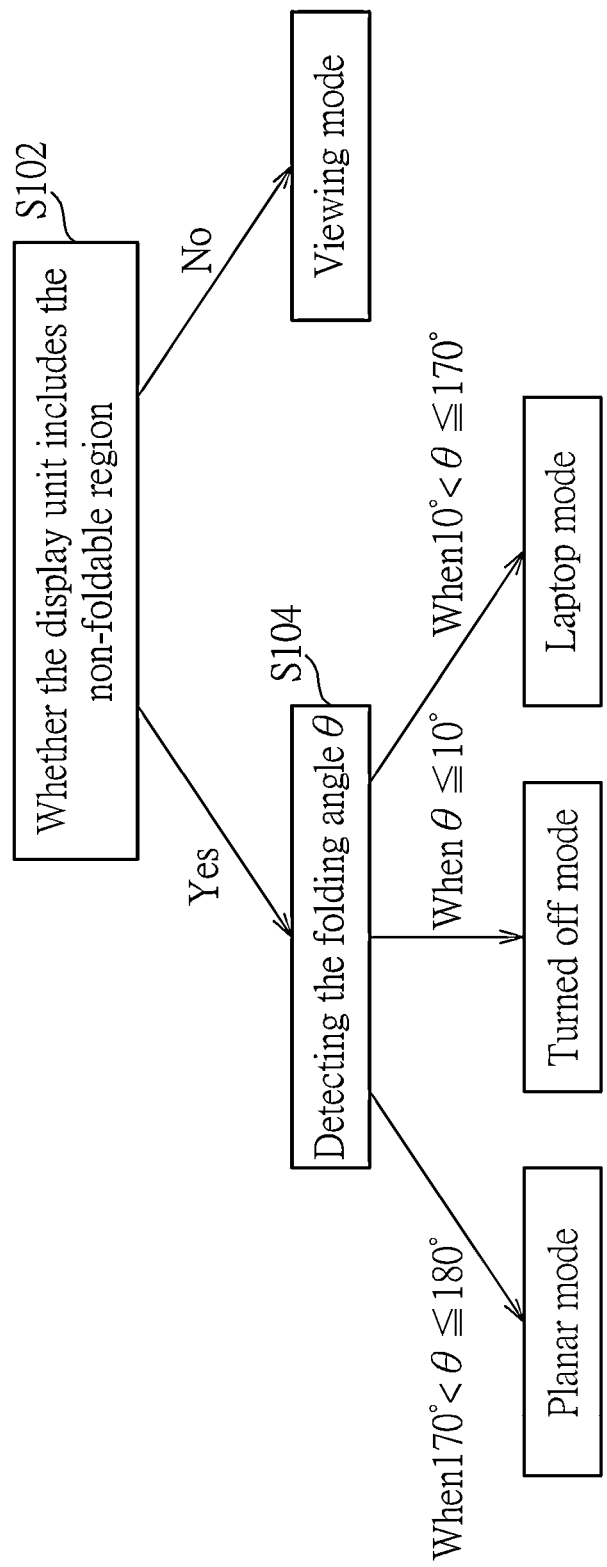
FIG. 19 schematically illustrates a flow chart of auto function of an electronic device according to a first embodiment of the present disclosure.
Figure 20:
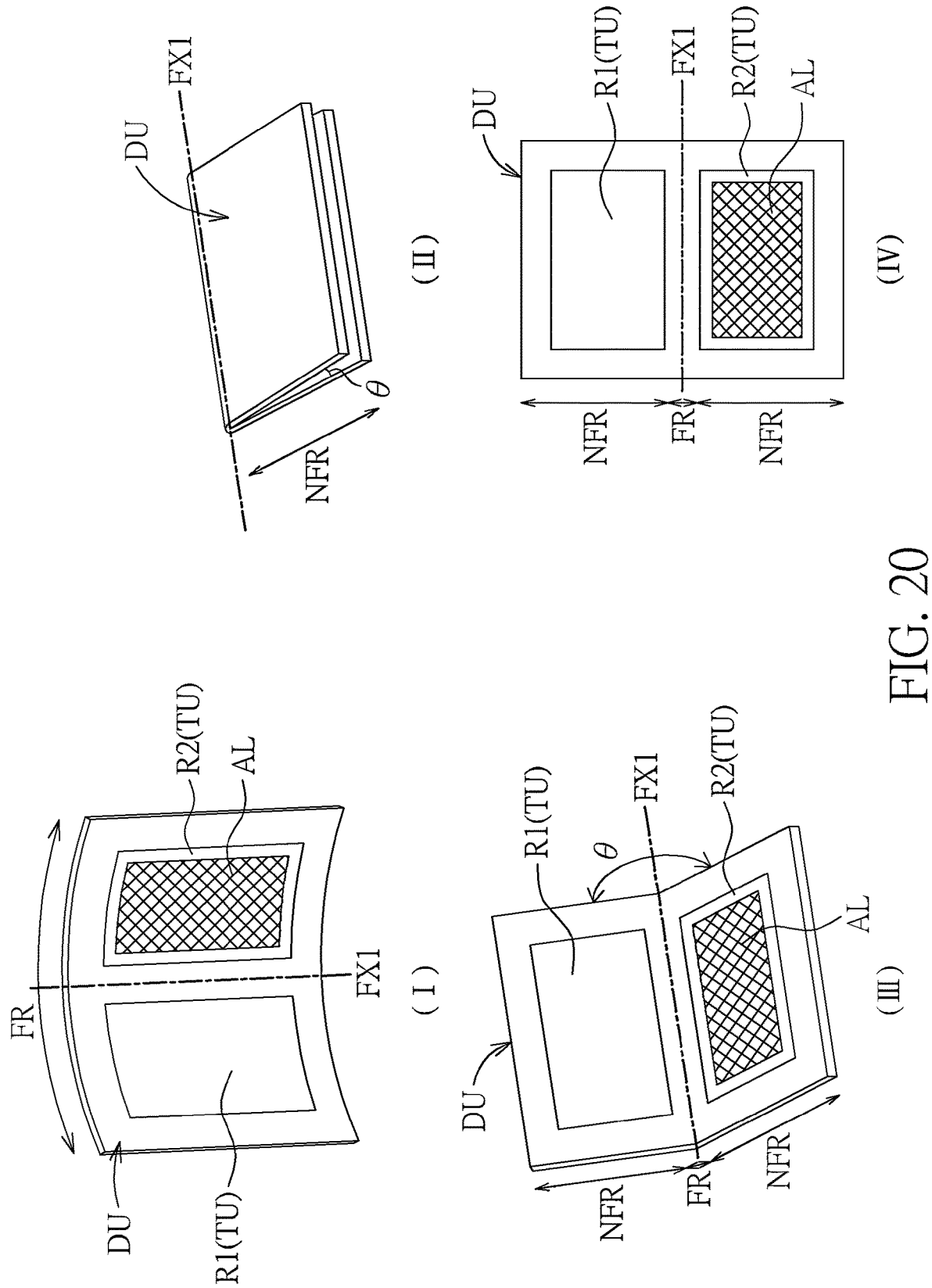
FIG. 20 schematically illustrates an electronic device in different states according to a first embodiment of the present disclosure.

Referring to FIG. 19 and FIG. 20, FIG. 19 schematically illustrates a flow chart of auto function of an electronic device according to a first embodiment of the present disclosure, and FIG. 20 schematically illustrates an electronic device in different states according to a first embodiment of the present disclosure. In order to simplify the figure, FIG. 20 only shows the display unit DU, the first region R1 and the second region R2 of the touch unit TU, the actuating layer AL and the folding axis FX1, and other layers or elements are omitted. According to the present embodiment, the foldable display device 100 may include auto function. Specifically, the foldable display device 100 may detect at least one status of the device, and may decide the mode of the device under the detected status.

As shown in FIG. 19, a step S102 may be performed on the foldable display device 100 to detect whether the display unit DU includes the non-foldable region. When the foldable display device 100 does not include the non-foldable region, it may for example be in a viewing mode. In detail, when it is detected that the foldable display device 100 does not include the non-foldable region (such as the non-foldable region NFR shown in FIG. 2), the entire foldable display device 100 may be foldable, and may form a curved surface (that is, the foldable display device 100 may only include the foldable region FR, as shown in the status (I) of FIG. 20). In status (I), the display unit DU may be turned on to display images, the first region R1 and the second region R2 of the touch unit TU may be turned off and may not include touch function, and the actuating units in the actuating layer AL may be turned off and may not be deformed. Therefore, the foldable display device 100 may for example be a curved display in the status (I), but not limited thereto. It should be noted that the "turned off element" mentioned above may represent that the element is not turned on because there is no power supply, or, although the element is supplied with power, it is not turned on (for example, in a stationary state) to save electricity, but the present disclosure is not limited thereto. In the present embodiment, the stationary state of the display unit DU may represent that the displayed images observed by the eyes is dark, and the stationary state of the touch unit TU may represent that no signal scanning is performed, but the present disclosure is not limited thereto. The concepts of the turned off element mentioned above may be applied to the following contents, and will not be redundantly described.

When the foldable display device 100 is detected that the device includes the non-foldable region in the step S102, a step S104 may further be performed on the foldable display device 100 to detect the folding angle θ of the foldable display device 100. The definition of the folding angle θ is described in the above-mentioned contents, and will not be redundantly described here. When the detected folding angle θ is lower than or equal to 10 degrees (θ≤10°), the foldable display device 100 may be in a turned off mode. In detail, the first region R1 and the second region R2 of the touch unit TU are close to each other toward the folding axis FX1, and the folding angle θ of the non-foldable region NFR located at two sides of the folding axis FX1 meets the above-mentioned conditions, as shown in the status (II) of FIG. 20. In status (II), the display unit DU may be turned off and may not display images, the first region R1 and the second region R2 of the touch unit TU may be turned off and may not include touch function, and the actuating units in the actuating layer AL may be turned off and may not be deformed.

When the detected folding angle θ is greater than 10 degrees and lower than or equal to 170 degrees (10°<θ≤170°), the foldable display device 100 may be in a laptop mode. In detail, the first region R1 and the second region R2 of the touch unit TU are close to each other toward the folding axis FX1, and the folding angle θ of the non-foldable region NFR located at two sides of the folding axis FX1 meets the above-mentioned conditions, as shown in the status (III) of FIG. 20. In status (III), the first region R1 of the touch unit TU may be turned off, the portion of the display unit DU corresponding to the first region R1 may be served as a display screen, the second region R2 of the touch unit TU may be turned on and served as a keyboard, and the actuating layer AL corresponding to the second region R2 may be turned on and may be deformed. It should be noted that although the portion of the display unit DU corresponding to the first region R1 is served as a display screen, and the portion of the display unit DU corresponding to the second region R2 is served as a keyboard in the present embodiment, the present disclosure is not limited thereto. In addition, the radius of curvature of the foldable display device 100 in status (III) may for example range from 0.1 centimeters (cm) to 5 centimeters (0.1 cm≤radius of curvature≤5 cm). The definition of the radius of curvature is described in the above-mentioned contents, and will not be redundantly described here.

When the detected folding angle θ is greater than 170 degrees and lower than or equal to 180 degrees (170°<θ≤180°), the foldable display device 100 may be in a planar mode, as shown in the status (IV) of FIG. 20. In detail, the non-foldable region NFR located at two sides of the folding axis FX1 may substantially be coplanar, as shown in the status (IV) of FIG. 20. In status (IV), the display unit DU may be turned on to display images, the first region R1 and the second region R2 of the touch unit TU may be turned on to provide touch function, and the actuating layer AL may be turned off to save electricity, but not limited thereto. In addition, the radius of curvature of the foldable display device 100 may for example be zero or infinity in the planar mode. That is, the foldable display device 100 may almost be a flat without being folded, but not limited thereto.

The auto function of the foldable display device 100 in the above-mentioned embodiment may be applied to other embodiments of the present disclosure. Besides, the modes described in the above-mentioned embodiment t are only for illustration, and the present disclosure is not limited thereto. The foldable display device 100 of the present disclosure may be designed to include different modes according to different demands.

In summary, a foldable display device is provided by the present disclosure, the device includes a display unit, a touch unit and a driving unit. The touch unit may include a first region and a second region, wherein the first driving circuit and the second driving circuit in the driving unit may separately drive the first region and the second region, such that the first region and the second region may be turned on separately, and the functionality of the foldable display device is improved. In addition, the foldable display device of the present disclosure may further include actuating units, wherein the actuating units provide the effect of convenient locating and convenient operation when the foldable display device is used as a laptop, thereby improving the convenience of the foldable display device.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
    a display unit, comprising:
        a substrate; and
        an insulating layer disposed on the substrate, wherein the insulating layer comprises a first protruding structure, a second protruding structure and a third protruding structure, the second protruding structure is located between the first protruding structure and the third protruding structure, and a height included between the first protruding structure and the second protruding structure is greater than a height included between the second protruding structure and the third protruding structure;
    a sensing unit overlapped with the substrate and comprising a first sub-unit and a second sub-unit;
    a first signal input electrically connected to the first sub-unit;
    a second signal input electrically connected to the second sub-unit; and
    a wire electrically connected to the sensing unit and disposed on the insulating layer, wherein at least a portion of the wire is disposed on a top surface and a side surface of the first protruding structure, a top surface and a side surface of the second protruding structure, and a top surface and a side surface of the third protruding structure,
    wherein the first sub-unit and the second sub-unit are symmetrical to an axis, and the first signal input and the second signal input are asymmetrical to the axis.

2. The electronic device of claim 1, wherein the axis is located between the first sub-unit and the second sub-unit.

3. The electronic device of claim 1, further comprising a driving unit, wherein the first sub-unit is driven by the driving unit through the first signal input, and the second sub-unit is driven by the driving unit through the second signal input.

4. The electronic device of claim 1, wherein an area of the first sub-unit is the same as an area of the second sub-unit.

5. The electronic device of claim 1, wherein a shape of the first sub-unit is the same as a shape of the second sub-unit.

6. The electronic device of claim 1, wherein the first signal input is overlapped with the first sub-unit, and the second signal input is overlapped with the second sub-unit.

7. The electronic device of claim 1, wherein an extending direction of the axis is parallel to at least one edge of the first sub-unit and at least one edge of the second sub-unit.

8. The electronic device of claim 1, wherein the electronic device has a first side, an extending direction of the first side is perpendicular to an extending direction of the axis, and in the extending direction of the axis, a distance between the first signal input and the first side is different from a distance between the second signal input and the first side.

9. The electronic device of claim 8, wherein in the extending direction of the axis, a distance between the first sub-unit and the first side is the same as a distance between the second sub-unit and the first side.

10. The electronic device of claim 1, further comprising a plurality of pixels disposed on the substrate, wherein the first sub-unit is overlapped with a portion of the plurality of pixels, and the second sub-unit is overlapped with another portion of the plurality of pixels.

* * * * *